(12) United States Patent
Miyamoto et al.

(10) Patent No.: US 7,423,233 B2
(45) Date of Patent: Sep. 9, 2008

(54) BUTT WELDING DEVICE AND BUTT WELDING METHOD

(75) Inventors: Yutaka Miyamoto, Hamura (JP); Takao Minagawa, Hamura (JP); Shinichi Inagaki, Hamura (JP); Kiyoyuki Fukui, Amagasaki (JP)

(73) Assignees: Sumitomo Metal Industries, Ltd., Osaka (JP); Kikuchi Co., Ltd., Tokyo (JP)

( * ) Notice: Subject to any disclaimer, the term of this patent is extended or adjusted under 35 U.S.C. 154(b) by 29 days.

(21) Appl. No.: 10/523,579

(22) PCT Filed: May 28, 2004

(86) PCT No.: PCT/JP2004/007743

§ 371 (c)(1),
(2), (4) Date: Jan. 28, 2005

(87) PCT Pub. No.: WO2004/108340

PCT Pub. Date: Dec. 16, 2004

(65) Prior Publication Data

US 2006/0151441 A1    Jul. 13, 2006

(30) Foreign Application Priority Data

Jun. 5, 2003    (JP) .............................. 2003-160548

(51) Int. Cl.
*B23K 11/02*    (2006.01)
*B23K 11/06*    (2006.01)

(52) U.S. Cl. ........................... 219/83; 219/84; 219/101; 219/102; 219/104

(58) Field of Classification Search .................... 219/81, 219/83, 84, 101–105
See application file for complete search history.

(56) References Cited

U.S. PATENT DOCUMENTS 2,036,041 A     3/1936   Granfield et al.
2,892,921 A  *  6/1959   Mecklenborg ................ 219/81

(Continued)

FOREIGN PATENT DOCUMENTS

DD    0 152 504    12/1981

(Continued)

*Primary Examiner*—Kevin P Kerns
(74) *Attorney, Agent, or Firm*—Flynn, Thiel, Boutell & Tanis, P.C.

(57) ABSTRACT

A butt welding apparatus and a butt welding method where end faces of at least one plate member to be welded are butted to each other to form a butt portion, and butt welding can be performed on respective plate members which have various thickness sizes on both side portions of the butt portion with electric resistance heat by a pair of electrode members which are common to the respective plate members. At least one electrode member (1) is provided on an outer face thereof with a convex portion (1A) which gradually retreats from one plate member (31) of two plate members (31, 32) as it extends from an intermediate portion, in a thickness direction, of the one electrode member (1) along the one plate member (31). Butt welding of the two plate members (31, 32) is performed by the position of the butting portion (71) of these plate members (31, 32) being offset from the intermediate portions, in the thickness directions, of the electrode members (1, 2) to the convex portion (1A) by an amount (L1) corresponding to a difference in thickness between the plate members (31, 32).

22 Claims, 17 Drawing Sheets

U.S. PATENT DOCUMENTS

| | | | | |
|---|---|---|---|---|
| 3,265,277 A | * | 8/1966 | Bacroix | 228/44.3 |
| 2005/0011864 A1 | * | 1/2005 | Miyamoto et al. | 219/83 |

FOREIGN PATENT DOCUMENTS

| | | | |
|---|---|---|---|
| FR | 2 733 528 | | 10/1996 |
| GB | 867 588 | | 5/1961 |
| JP | 60-6273 | * | 1/1985 |
| JP | 60-006273 | | 1/1985 |
| JP | 1-186227 | | 7/1989 |
| JP | 03-060874 | | 3/1991 |
| JP | 8-39261 | * | 2/1996 |
| JP | 8-39261 A | * | 2/1996 |
| JP | 09-141449 | | 6/1997 |
| JP | 11-077318 | | 3/1999 |
| JP | 2000-167673 | * | 6/2000 |
| JP | 2000-167673 A | * | 6/2000 |
| JP | 2000-254785 | | 9/2000 |
| JP | 2000-254785 A | * | 9/2000 |
| JP | 2003-305572 | | 10/2003 |
| WO | WO 01/68435 A1 | | 9/2001 |
| WO | WO 03/068443 | | 1/2003 |

* cited by examiner

F I G. 2 1
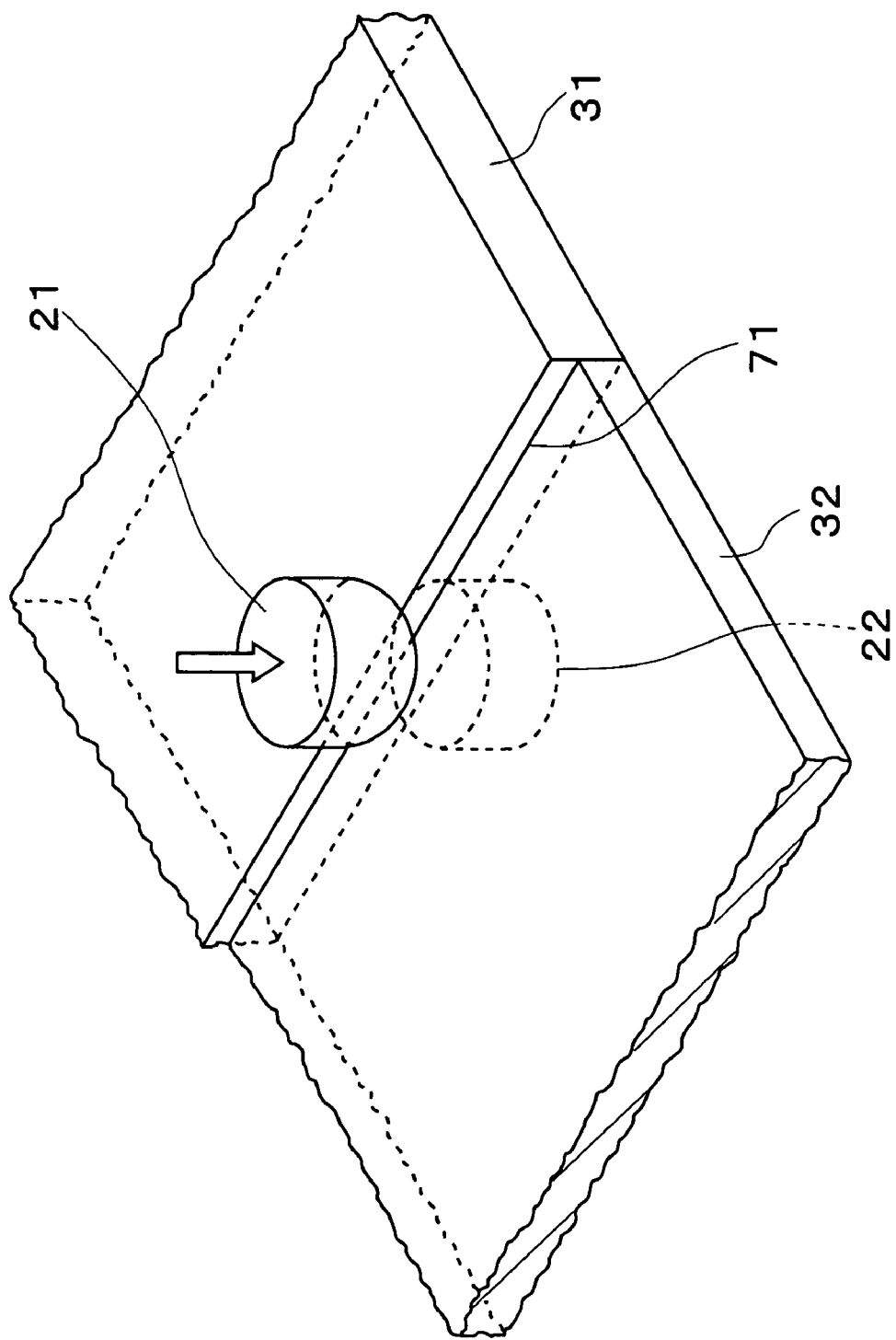

BUTT WELDING DEVICE AND BUTT WELDING METHOD

BACKGROUND OF THE INVENTION

1. Technical Field

The present invention relates to a butt welding apparatus and a butt welding method for melting and joining a butt portion obtained by butting end faces of at least one plate member to be welded to each other with electric resistance heat generated by supplying power between a pair of electrode members.

2. Background Art

JP2003-305572A describes a butt welding apparatus where a pair of electrode members are arranged at a butt portion formed by butting end faces of two plate members to be welded to each other and the butt portion is melted and joined with electric resistance heat generated by applying power between the electrode members.

The conventional butt welding apparatus is a butt welding apparatus having a pair of electrode members disposed on both sides of two plate members to be welded in a thickness direction thereof, end faces of the two plate members being butted to each other to constitute a butt portion and each of the electrode members having such a thickness as to bridge across the butt portion, for melting the butt portion of the two plate members to be welded with electric resistance heat generated by supplying current between the electrode members to join the plate members to be welded, where press portions are provided in the pair of electrode members, for pressing one plate member of the two plate members to be welded in the thickness direction thereof to swell and deform the end face of the one plate member to be welded, which faces the other plate member to be welded, toward the other plate member to be welded according to this pressing.

According to the conventional butt welding apparatus, one plate member of two plate members, namely, one side portion of both side portions of the butt portion, is pressed by the pressing portions of the pair of electrode members at a starting time of a butt welding work. Thereby, the end face of the one plate member which faces the other plate member, in other words, the end face on the one side portion which faces the opposite side portion swells and deforms toward the opposite side portion to come in contact with the end face of the one side portion securely. Therefore, even if the end faces of these portions are not subjected to polishing work or the like for finishing prior to a butt welding work, an electrically conductive state between the end faces of the both portions can be ensured and a nugget bridging across these end faces is securely formed so that a large joining strength can be achieved.

Further, in the conventional common butt welding where a pair of electrode members are used, foils comprising metal thin films bridging across a butt portion of plate members are placed on both surfaces of the plate members in a thickness direction thereof, and a pair of electrode members are brought in pressure contact with the plate members via these foils so that a butt welding of the plate members is performed while preventing melding pieces generated due to electric resistance heat from leaking externally. However, according to the conventional butt welding apparatus described in JP2003-305572A, such foils are made unnecessary.

Furthermore, according to the conventional butt welding apparatus, when both side portions of the butt portion are different in thickness or when they have the same thickness, at least one electrode member of the pair of electrode members is formed in a shape of a projecting stepped portion so that the one side portion of both side portions of the butt portion can be pressed toward the thickness direction of the plate members. As a result, the end face of the one side portion is caused to swell and deform toward the opposite side portion of both side portions and, therefore, the end faces of the plate members positioned at both side portions can be brought in contact with each other.

In the conventional butting welding apparatus, however, the projecting amount of the projecting stepped portion provided on the at least one electrode member of the pair of electrode members is set according to the thickness sizes of both portions of the butt portion to be butt-welded. Therefore, when butt welding works are performed on respective plate members having differences in thickness between both side portions of their butt portions or when butt welding work is performed on a plate member having the same thickness size of both side portions of a butt portion thereof, electrode members which are respectively provided with projection portions having different projecting amounts are eventually used. Accordingly, various electrode members provided with projecting stepped portions having different projecting amounts must be prepared in order to allow each of the plate members having various thickness sizes of both side portions of the butt portion to be butt-welded.

An object of the present invention is to provide a butt welding apparatus and a butt welding method where end faces of at least one plate member to be welded are butted to each other, and butting welding works regarding respective plate members to be welded having various thickness sizes of both side portions of their butt portions can be implemented by electrode members made common.

DISCLOSURE OF THE INVENTION

A butt welding apparatus according to the present invention is a butt welding apparatus having a pair of electrode members disposed on both sides, in a thickness direction, of at least one plate member to be welded whose end faces are butted to constitute a butt portion, each electrode member having a thickness size bridging across the butt portion, and the electrode members being provided with pressing portions for pressing one side portion of both side portions of the butt portion of the at least one plate member to be welded in a thickness direction of the at least one plate member to swell and deform an end face of the one side portion which faces the other side portion of the both side portions toward the other side portion by the pressing, for melting and joining the butt portion due to electric resistance heat generated by supplying current between the pair of electrode members, wherein at least one electrode member of the pair of electrode members is provided on an outer surface thereof which faces the at least one plate member to be welded with a convex portion formed so as to gradually retreat from one portion of both portions of the at least one plate member to be welded which are defined through the butt portion as it extends from an intermediate portion, in a thickness direction, of the at least one electrode member of the pair of electrode members along the one portion of the both portions of the at least one plate member to be welded.

In the butt welding apparatus, at least one electrode member of a pair of electrode members is provided on its outer face with the convex portion formed so as to gradually retreat from one portion of both portions of the at least one plate member to be welded which are defined through the butt portion as it extends from an intermediate portion, in a thickness direction, of the at least one electrode member along the one portion of the both portions of the at least one plate member to be welded. Therefore, when a butt welding work of a plate member is started, one side portion of both side portions of a butt portion of the plate member is pressed by a proper portion of the convex portion corresponding to a difference in thickness between both side portions of the butt portion of the plate member, and when both side portions of the butt portion of the plate member have the same thickness size, one side portion of both side portions of the butt portion is pressed by a portion of the convex portion which projects toward the plate member in the maximum amount.

Thereby, the portion of the convex portion which presses the one side portion of both side portions of the butt portion serves as the pressing portion of the electrode member, so that an end face of the one side portion which faces the opposite side portion can be swelled and deformed toward the opposite side portion.

When butt welding is performed on another plate member having a different thickness difference between both side portions of a butt portion, a position of the butt portion of the other plate member to be set to the pair of electrode members is changed so that the butt welding work is performed utilizing a portion of the convex portion different from a portion thereof used for the previous butt welding as the pressing portion.

Thereby, regarding respective plate members with different thickness sizes of both side portions of their butt portions, butt welding works therefor can be performed by using the same electrode member provided on an outer face thereof with the convex portion, so that a common use of the electrode member can be realized.

Further, since it is unnecessary to form, on an electrode member, a projecting stepped portion having a projecting amount corresponding to a difference in thickness between both side portions of a butt portion of each plate member or the like, it is made unnecessary to conduct a maintenance work on the projecting amount of the projecting stepped portion on the electrode member, so that workability on the electrode member can be improved.

When the convex portion is provided on one electrode member of a pair of electrode members, the one electrode member can take one of the following aspects.

In a first aspect, the convex portion is defined as a first convex portion on the one electrode member provided with the convex portion, and a second convex portion formed so as to gradually retreat from the other portion of the plate member as it extends from an intermediate portion, in a thickness direction, of the one electrode member along the opposite side portion to the one side portion of the plate member, namely, as it extends along the other portion of the plate member, is provided on the outer face of the one electrode member, and the second convex portion and the first convex portion are connected to each other.

In a second aspect, a projecting continuous portion having a projecting amount equal to or approximately equal to the maximum projecting amount of the convex portion which projects toward the one plate member is provided on the outer face of the one electrode member provided with the convex portion, and the projecting continuous portion connected to the convex portion is defined as a portion where the equal or approximately equal projecting amount is continuous from the intermediate portion, in the thickness direction, of the one electrode member along the other portion of the plate member.

Incidentally, the term "approximately equal projecting amount" in the second aspect means that projecting amounts may not become exactly equal to one another due to, for example, a manufacturing error of an electrode member, wearing of an electrode member used for a long term or the like.

Further, when the convex portion is provided on one electrode member of a pair of electrode members, the shape of the other electrode member can take one of the following shapes.

In a first aspect, the outer face of the other electrode member is defined as a flat-shaped portion having an equal or approximately equal projecting amount toward the plate member continuous along a thickness direction of the other electrode member.

Also, the term "approximately equal projecting amount" in the first aspect means that projecting amounts may not become exactly equal to one another due to, for example, a manufacturing error of an electrode member, wearing of an electrode member used for a long term or the like.

In a second aspect, a convex portion formed so as to gradually retreat from the one portion of the plate member as it extends from an intermediate portion, in a thickness direction, of the other electrode member along the one portion of the plate member is provided on an outer face of the other electrode member, the convex portion is defined as a first convex portion on the other electrode member, a second convex portion formed so as to gradually retreat from the other portion of the plate member as it extends from an intermediate portion, in the thickness direction, of the other electrode member along the other portion of the plate member is provided on the outer face of the other electrode member, and the second convex portion and the first convex portion are connected to each other.

In a third aspect, a convex portion formed so as to gradually retreat from the one portion of the plate member as it extends from an intermediate portion, in a thickness direction, of the other electrode member along the one portion of the plate member and a projecting continuous portion having a projecting amount equal or approximately equal to the maximum projecting amount of the convex portion which projects toward the plate member are provided on an outer face of the other electrode member, and the projecting continuous portion connected to the convex portion is defined as a portion where the equal or approximately equal projecting amount is continuous from the intermediate portion, in the thickness direction, of the other electrode member along the other portion on the plate member.

Incidentally, the term "approximately equal projecting amount" in the third aspect means that projecting amounts may not become exactly equal to one another due to, for example, a manufacturing error of an electrode member, wearing of an electrode member used for a long term or the like.

In the above, each convex portion provided on one electrode member or both electrode members of a pair of electrode members may take any shape where it retreats from a plate member gradually. The convex portion may take, for example, an oval shape, a parabolic shape, an arc shape, or a linear shape, and it also may take a shape obtained by combining at least two of these shapes.

Further, in the present invention, the pair of electrode members may be a pair of electrode rollers which roll on a plate member, or they may be a pair of block electrodes which have such length sizes as to extend along a butt portion of a plate member and apply a press load on the plate member.

When the pair of electrode members are constituted of the latter pair of block electrodes, a butt welding work on a plate member can be finished by once pressing a butt portion of the plate member with the respective block electrodes, so that a reduction in butt welding work time or a high efficiency on many butt welding works can be achieved.

When the pair of electrode members are constituted of a pair of block electrodes, a butt portion of a plate member may be a linearly extending one, or a non-linearly extending one. When the butt portion is the linearly extending portion, the pair of block electrodes may be constituted so as to have linearly extending shapes corresponding to the butt portion. When the butt portion is the non-linearly extending portion, the pair of block electrodes may be constituted so as to have non-linearly extending portions corresponding to the butt portion. Here, the term "non-linearly" includes a case where straight lines are curved at an intermediate portion to be connected, a case where a curve including an arc or a straight line and a curve are connected, and a case where a curve and a curve are connected.

When the pair of electrode members are constituted of the pair of block electrodes, a plate member before being subjected to a press forming may be butt-welded by these block electrodes, or the respective block electrodes may be formed so as to have shapes corresponding to a shape of a plate member which has been press-formed so that a butt welding work of the press-formed plate member may be performed by these block electrodes.

In addition, when the pair of electrode members are constituted of a pair of block electrodes, the respective block electrodes are disposed in press dies for press-forming a plate member, and when the plate member is press-formed by these press dies, a butting welding work of the plate member may be performed by the pair of block electrodes.

When the pair of block electrodes are disposed in the respective press dies in this manner, the pair of block electrodes are assembled in the respective press dies via electrically insulating members, so that an electrically insulated state between the block electrodes and the press dies can be ensured.

In the present invention, also, the pair of electrode members may be a pair of spot electrodes for performing spot welding on a plate member. That is, the present invention is applicable to a spot welding apparatus. Further, the pair of spot electrodes may be for performing butt welding on a plate member before it is press-formed or it may be for performing butt welding on a press-formed plate member like the above-described block electrodes. Furthermore, the respective spot electrodes may be disposed in press dies for press-forming a plate member, and when the plate member is press-formed by these press dies, butting welding of the plate member may be performed by the pair of spot electrodes.

When the pair of spot electrodes are disposed in the press dies in this manner, the pair of spot electrodes are assembled in the respective press dies via electrically insulating members, so that an electrically insulated state between the spot electrodes and the press dies can be ensured.

Moreover, a butt welding method according to the present invention is a butt welding method where at least one electrode member of a pair of two electrode members which are disposed on both sides, in a thickness direction, of at least one plate member to be welded, end faces of the at least one plate member to be welded being butted to each other to constitute a butt portion and each electrode member having a thickness size bridging across the butt portion, is provided on an outer face of the one electrode member with a convex portion which gradually retreats from one side portion of both side portions of the butt portion of the at least one plate member to be welded as it extends from an intermediate portion, in a thickness direction, of the one electrode member along the one side portion of both side portions of the butt portion of the at least one plate member to be welded, and the butt portion of the plate member to be welded is butt-welded by the pair of electrode members, comprising: a working step of setting the position of the butt portion relative to the pair of electrode members at a position having an offset amount corresponding to thickness sizes of both side portions of the butt portion of the at least one plate member to be welded from the intermediate portion, in the thickness direction, of the one electrode member toward the convex portion; and another working step of pressing one portion of both portions of the at least one plate member to be welded which are defined through the butt portion on the plate member to be welded by the pair of electrode members being supplied with power to swell and deform an end face of the one portion which faces the other portion of both portions toward the other portion, thereby melting and joining the butt portion with electric resistance heat.

According to the butt welding method, since the offset amount is set so as to correspond to the thickness sizes of both side portions of a butt portion of a plate member to perform butt welding on the plate member, butt welding works on plate members having various thickness sizes of both side portions of butt portions thereof can be performed according to setting of the offset amount using a pair of two electrode members which have been made common to the various thickness sizes.

The butt welding method can be implemented even when the pair of electrode members are constituted of electrode rollers, block electrodes or spot electrodes. The pair of electrode members constituted of the block electrodes or the spot electrodes are arranged in respective press dies for press-forming a plate member, so that, when the plate member is press-formed by these press dies, butt welding of the plate member can be performed by the pair of electrode members.

In the present invention explained above, the number of plate members where end faces are butted to each other to constitute a butt portion may be two or one.

When the number of plate members where end faces are butted to each other to constitute a butt portion is one, the one plate member is bent to a shape of a circle pipe or a rectangular pipe, and two end faces of the one plate member thus formed in a pipe shape are butted to each other. The one plate member may be one formed by joining a plurality of plate members having different thickness sizes or the same thickness size.

When the number of plate members where end faces are butted to each other to constitute a butt portion is two, the two plate members are the number of plate members arranged when they are butt-welded to each other. Accordingly, such a case that a plurality of plate members are arranged along an end face of one plate member and these plate members are butt-welded is also included in the present invention.

In the present invention, a positional relationship between a pair of electrode members and a plate member may be a positional relationship where two electrode members are disposed on an upper side and a lower side of a plate member whose thickness direction corresponds to a vertical direction or it may be a positional relationship where two electrode members are disposed on a left side and a right side of a plate member whose thickness direction corresponds to left and right directions.

Further, the butt welding apparatus and the butt welding method according to the present invention are applied for performing butt welding on a butt portion of any plate member made from any material which melts due to electrical resistance heat. The material may be, for example, steel, stainless steel, aluminum, titanium, magnesium, or an alloy of various materials. In addition, materials of both side portions of a butt portion to be butt-welded may be the same or different from each other.

BRIEF DESCRIPTION OF THE DRAWINGS

FIG. 21 is a perspective view schematically showing a butt welding apparatus of an embodiment where electrode members are spot electrodes;

BEST MODE FOR CARRYING OUT THE INVENTION

Figure 1:
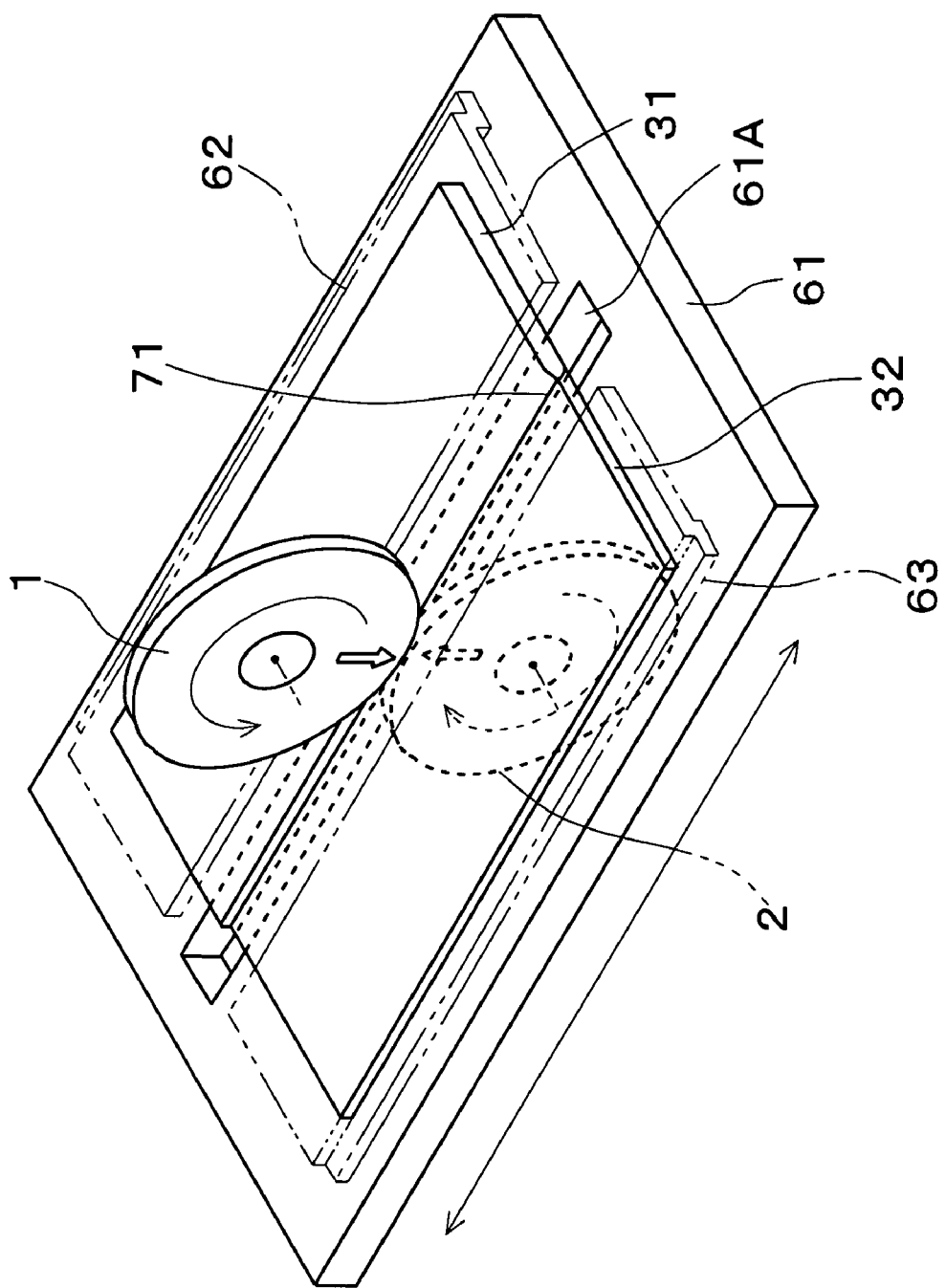
FIG. 1 is a perspective view schematically showing a butt welding apparatus according to one embodiment of the present invention where the electrode members are electrode rollers.

The present invention will be described in more detail with reference to the accompanying drawings. FIG. 1 is a perspective view schematically showing a butt welding apparatus according to an embodiment of the present invention. Two plate members to be welded 31, 32, each composed of a steel plate or another metal plate, are butted and fixedly set on a work table 61 of a welding apparatus by fixing tools 62, 63. One of the plate members is a thick plate member 31 having a large thickness size and the other plate member is a thin plate member 32 having a small thickness size.

Figure 2:
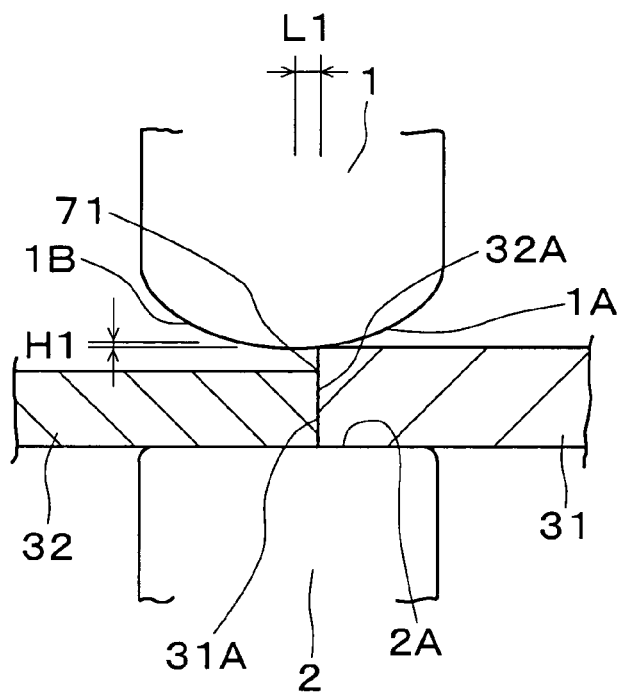
FIG. 2 is a view showing a butt portion of two plate members in an enlarged manner and showing a state in which butt welding starts when a thick plate member and a first thin plate member are butt-welded with a first combination of a pair of two electrode rollers.

FIG. 2 shows a butt portion 71 of an end face 31A of the thick plate member 31 and an end face 32A of the thin plate member 32 in an enlarged manner. The butt portion 71 is coincident with the position of an elongated opening portion 61A in the work table 61 shown in FIG. 1, and two electrode rollers 1 and 2, serving as a pair of electrode members for butt-welding the butt portion 71 with electric resistance heat, are disposed above and below the opening portion 61A, namely, on both sides, in a thickness direction, of the two plate members 31, 32. The upper side electrode roller 1 of the electrode rollers 1, 2, each having a thickness size bridging across the butt portion 71, moves up and down with respect to the work table 61, the lower side electrode roller 2 moves up and down at a position where it is inserted into the opening portion 61A, and these electrode rollers 1, 2 abut the plate members 31, 32 to perform butt welding thereto. Further, the work table 61 moves in a lengthwise direction of the butt portion 71 during welding work, so that the butt portion 71 is melted and joined over its entire length with electric resistance heat in the plate members 31, 32 by the electrode rollers 1, 2 rolling while being supplied with power during the welding.

Incidentally, though is not illustrated, means for supplying a non-oxidizing gas such as argon gas, nitrogen gas or the like to the butt portion 71 during the welding work is provided in the welding apparatus, where the butt portion 71 is welded while being supplied with a non-oxidizing gas.

As shown in FIG. 2, the thick plate member 31 and the thin plate member 32 are butted to each other in a state that respective one surfaces of both surfaces of the thick plate member 31 and both surfaces of the thin plate member 32 in thickness directions thereof, in other words, respective one surfaces of two surfaces and two back surfaces thereof are shifted from each other so as to form a step difference and in a state that the other surfaces are coincident with each other so as not to form any step difference. Specifically, the thick plate member 31 and the thin plate member 32 are butted on each other in a state that surfaces of the upper surfaces and back surfaces of the thick plate member 31 and the thin plate member 32 are shifted so as to form a step difference and in the state that the back surfaces thereof are coincident with each other so as not to form any step difference.

As shown in FIG. 2, an outer surface of the electrode roller 1 of the two electrode rollers 1, 2 which is disposed on the upper side where the step difference exists between the thick plate member 31 and the thin plate member 32, the outer surface facing the plate members 31, 32, in other words, an outer peripheral surface of the electrode roller 1 is formed in an oval shape projecting toward the plate members 31, 32 in a curved manner. For this reason, a first convex portion 1A is formed so as to gradually retreat from the thick plate member 31 as it extends from a central portion, in a thickness direction, of the electrode roller 1 which is an intermediate portion, in the thickness direction, of the electrode roller 1 along one portion of portions defined through the butt portion 71, that is, along the thick plate member 31 is provided on the outer face of the electrode roller 1. Further, a second convex portion 1B is formed so as to gradually retreat from the thin plate member 32 as it extends from the central portion, in the thickness direction, of the electrode roller 1 along the other portion of the portions defined through the butt portion 71, which is positioned at the opposite side to the one portion, that is, along the thin plate member 32, is provided on the outer face of the electrode roller 1. The first and second convex portions 1A and 1B are smoothly connected to each other at the central portion, in the thickness direction, of the electrode roller 1.

On the other hand, an outer surface of the electrode roller 2 of the two electrode rollers 1, 2 which is disposed on the lower side where no step difference exists between the thick plate member 31 and the thin plate member 32, the outer surface facing the plate members 31, 32, is formed as a flat-shaped portion 2A whose projecting amount toward the plate members 31, 32 is constant along the thickness direction of the electrode roller 2, and an outer peripheral face of the electrode roller 2 is formed with the flat-shaped portion 2A.

Figure 3:
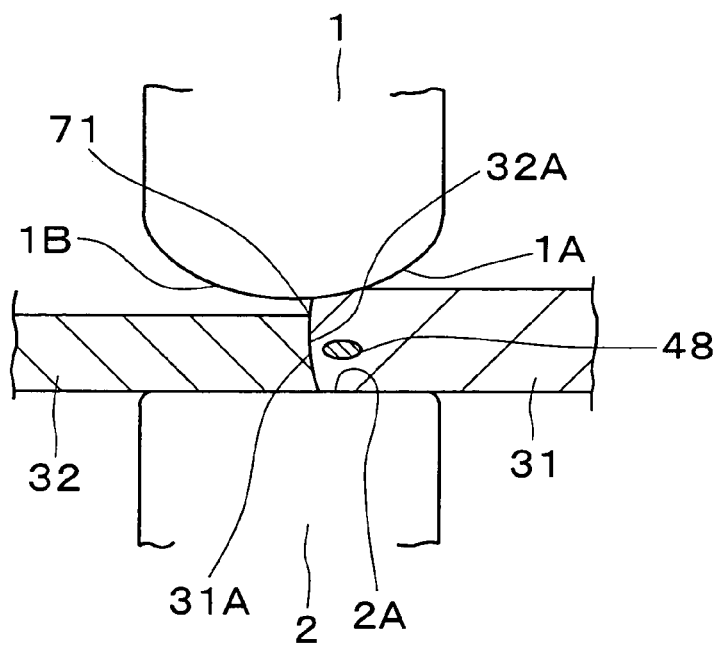
FIG. 3 is a view showing a state following the start of the butt welding in the case shown in FIG. 2.
Figure 4:
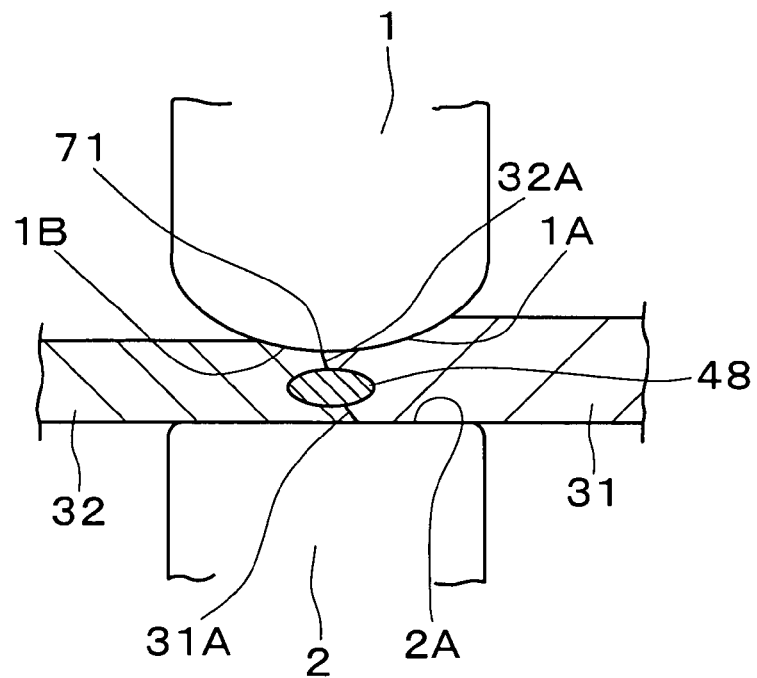
FIG. 4 is a view showing a state in which the butt welding has been finished in the case shown in FIG. 2.

FIG. 2 to FIG. 4 are views showing steps in a butt welding work performed according to its order by a combination of the above-described electrode rollers 1, 2 and the plate members 31, 32.

As shown in FIG. 2, the thick plate member 31 and the thin plate member 32 are fixedly set to the work table 61 shown in FIG. 1 in a state that the butt portion 71 of these plate members 31, 32 has been offset from the central portions of the electrode rollers 1, 2 in the thickness direction of the electrode rollers 1, 2 toward the first convex portion 1A of the electrode roller 1 by an amount corresponding to L1. The offset amount L1 is an amount corresponding to a difference in thickness between the thick plate member 31 and the thin plate member 32. The central portion, in the thickness direction, of the electrode roller 1 which constitutes the most projected portion on the outer face of the electrode roller 1 toward the thin plate member 32 projects, due to the offset amount L1, toward the thin plate member 32 from the portion of the first convex portion 1A corresponding to the position of the butt portion 71 by a projecting amount H1 corresponding to the offset amount L1.

After the plate members 31, 32 are fixedly set to the work table 61, the electrode rollers 1, 2 press the butt portion 71, so that butt welding of the plate members 31, 32 is started between the electrode rollers 1, 2 being supplied with power by this time.

As shown in FIG. 2, the butt welding is started from such a step that the first convex portion 1A of the electrode roller 1 presses an upper corner portion of the end face 31A of the thick plate member 31 downwardly and a portion of the flat-shaped portion 2A of the electrode roller 2 in contact with the thick plate member 31 receives the pressing force. For this reason, the first convex portion 1A on the electrode roller 1 and the flat-shaped portion 2A in contact with the thick plate member 31 on the electrode roller 2 serve as pressing portions for pressing the thick plate member 31, respectively.

As shown in FIG. 3, the end face 31A of the thick plate member 31 swells and deforms toward the thin plate member 32 due to the pressing force according to an advance in the pressing, so that the end face 31A comes in contact with the end face 32A of the thin plate member 32. For this reason, even if the end face 31A of the thick plate member 31 and the end face 32A of the thin plate member 32 prior to butt-welding have surfaces which were subjected to shearing work for producing the thick plate member 31 and the thin plate member 32 from blank members and they are faces which have not been subjected to finishing work such as polishing work, these end faces 31A and 32A securely come in contact with each other during the butt welding.

Further, when the electrode roller 1 presses and deforms the upper corner portion of the end face 31A of the thick plate member 31 up to a state shown in FIG. 3, a nugget 48 obtained by the melting of some material in the thick plate member 31 due to electric resistance heat generated by current conduction is produced inside the thick plate member 31 where a current route has been formed because the thick plate member 31 is in contact with both the electrode rollers 1 and 2.

When pressing of the thick plate member 31 by the electrode rollers 1, 2 further progresses, as shown in FIG. 4, the central portion, in the thickness direction thereof, of the electrode roller 1 having the projecting amount H1 from the butt portion 71 comes in contact with the thin plate member 32, and the second convex portion 1B of the electrode roller 1 also comes in contact with the thin plate member 32, so that the thin plate member 32 is pressed by both the electrode rollers 1 and 2. At this time, a current route has also been formed inside the thin plate member 32 brought into contact with both the electrode rollers 1 and 2, and a current route passing through the butt portion 71 of the end faces 31A and 32A of the plate members 31, 32 in contact with each other is also formed. For this reason, the nugget 48 is also produced inside the thin plate member 32 and it has such a size that it bridges across the end faces 31A, 32A of the plate members 31, 32.

The above is directed to an explanation about the same sectional position of the two plate members 31, 32 to be butt-welded to each other, but the butt welding progressing from the state shown in FIG. 2 to the state shown in FIG. 4 by the pair of two electrode rollers 1, 2 is conducted over the entire length of the butt portion 71 according to movement of the work table 61 shown in FIG. 1 and rolling of the electrode rollers 1, 2 relative to the plate members 31, 32 according to the movement.

Further, the nugget 48 bridging across both the plate members 31, 32 over the butt portion 71 is produced so that the butt welding strength of these plate members 31, 32 becomes large.

Incidentally, the above-described butt welding work can also be performed by making the work table 61 on which both the plate members 31, 32 are fixedly set stationary and moving the electrode rollers 1, 2 relative to the work table 61 and the plate members 31, 32 while being rolled.

Figure 5:
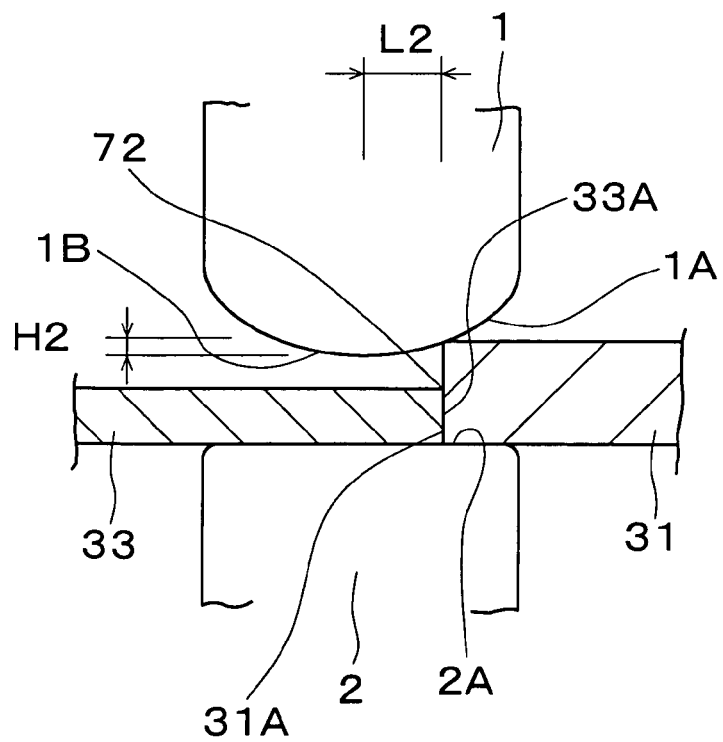
FIG. 5 is a view showing a state in which butt welding starts when a thick plate member and a second thin plate member are butt-welded with the combination of electrode rollers shown in FIG. 2.

FIG. 5 shows a case where the butt welding of the thick plate member 31 and a thin plate member 33 thinner than the plate member 32 is conducted using the same electrode rollers 1, 2 as shown in FIG. 2. The butt welding is also conducted in a state that top surfaces of the thick plate member 31 and the thin plate member 33 are shifted from each other to form a step difference and in a state that back surfaces thereof are coincident with each other so as not to form any step difference. In the butt welding, also, the position of the butt portion 72 of the thick plate member 31 and the thin plate member 33 relative to the central portion of the electrode rollers 1, 2 in the thickness direction thereof is offset toward the first convex portion 1A of the electrode roller 1, but an offset amount L2 thereof is larger than the offset amount L1 shown in FIG. 2.

That is, since a difference in thickness between the thick plate member 31 and the thin plate member 33 is larger than the difference in thickness between the thick plate member 31 and the thin plate member 32 shown in FIG. 2, the offset amount L2 shown in FIG. 5 becomes larger than the offset amount L1 shown in FIG. 2.

The butt welding shown in FIG. 5 is also started from such a step that the first convex portion 1A of the electrode roller 1 presses an upper corner portion of the end face 31A of thick plate member 31 downwardly, and a portion of the flat-shaped portion 2A of the electrode roller 2 in contact with the thick plate member 31 receives the pressing force. Thereafter, states similar to those shown in FIG. 3 and FIG. 4 occur, where the swelled and deformed end face 31A of the thick plate member 31 comes in contact with an end face 33A of the thin plate member 33 and the central portion, in the thickness direction, of the electrode roller 1 having a large projecting amount H2 toward the thin plate member 33 due to the offset amount L2 starts pressing the thin plate member 33 so that the second convex portion 1B of the electrode roller 1 also starts pressing the thin plate member 33. Thereby, a nugget which bridges across a butt portion 72 can be formed inside both the plate members 31 and 33.

Figure 6:
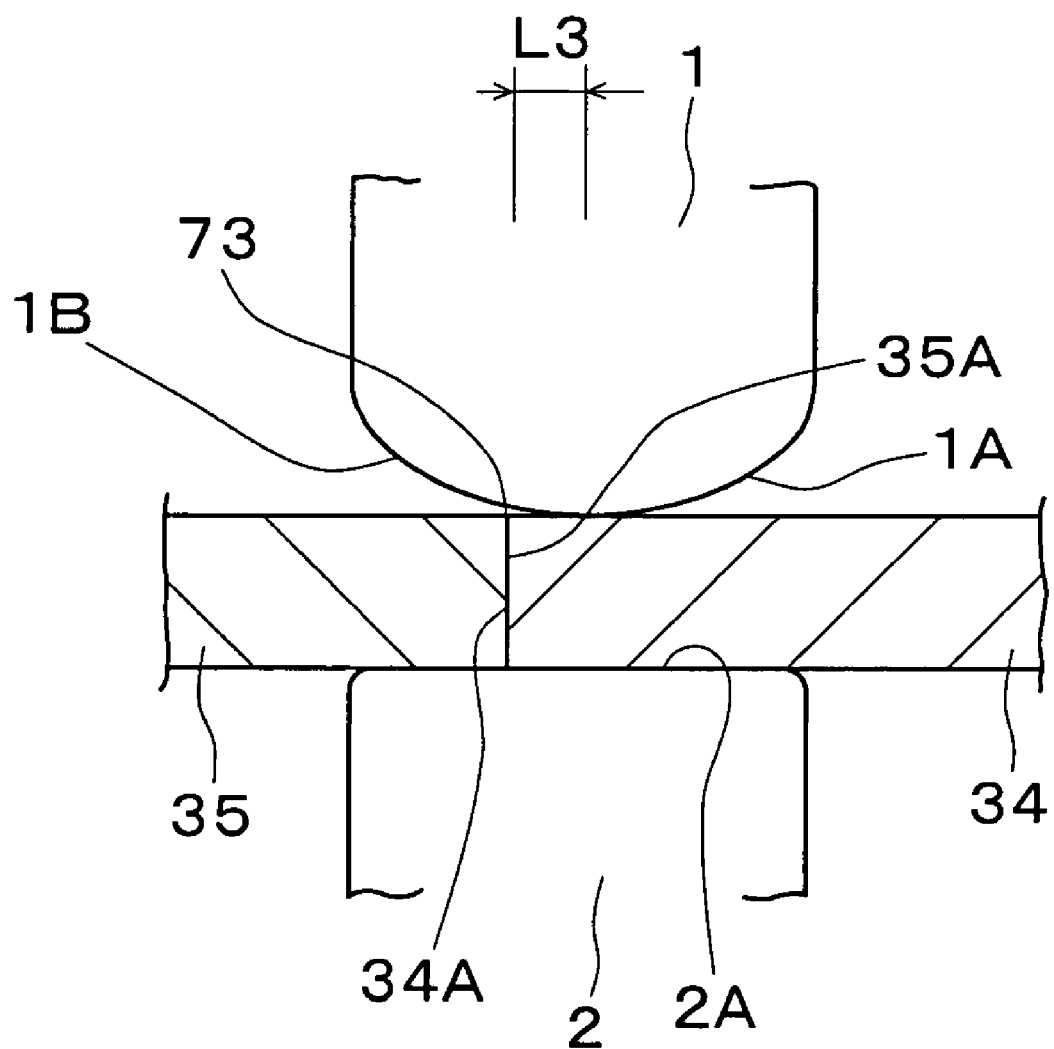
FIG. 6 is a view showing a state in which butt welding starts when two plate members having the same thickness size are butt-welded with the combination of electrode rollers shown in FIG. 2.

FIG. 6 shows a case when butt welding of two plate members 34, 35 having the same thickness size is conducted using the same electrode rollers 1, 2 as shown in FIG. 2. The butt welding is conducted in a state that a top surface and a back surface of the plate member 34 are coincident with those of the plate member 35 so as not to form any step difference. The butt welding is conducted in such a state that the position of a butt portion 73 of the two plate members 34, 35 relative to the central portions of the electrode rollers 1, 2 in the thickness direction of the electrode rollers has been offset toward one plate member, in the illustrated example, toward the second convex portion 1B of the electrode roller 1 in the opposite direction to the cases shown in FIG. 2 and FIG. 5. The offset amount is shown with L3 in FIG. 6.

The butt welding in the case shown in FIG. 6 is started from such a step that the central portion, in a thickness direction, of the electrode roller 1 presses a surface of the plate member 34 in the vicinity of an end face 34A thereof downwardly and the portion of the flat-shaped portion 2A of the electrode roller 2 in contact with the plate member 34 receives the pressing force. For this reason, in the electrode roller 1, the central portion of the electrode roller 1 in the thickness direction, in other words, an end portion of the first convex portion 1A connected to the second convex portion 1B serves as a pressing portion which presses one plate member 34 of the two plate members 34, 35 at a starting time of butt welding. In the electrode roller 2, the portion of the flat-shaped portion 2A in contact with the plate member 34 serves as a pressing portion which presses the plate member 34.

Thereafter, like the states shown in FIG. 3 and FIG. 4, the swelled and deformed end face 34A of the plate member 34 comes in contact with the end face 35A of the plate member 35, and then the second convex portion 1B of the electrode roller 1 presses the plate member 35 due to an offset amount L3. Thereby, a nugget which bridges across the end faces 34A, 35A is formed inside the plate members 34 and 35.

As apparent from the above explanation, according to this embodiment, the electrode roller 1 of the pair of electrode rollers 1, 2 is provided with the convex portion 1A which gradually retreats from one plate member of two plate members to be butt-welded as it extends from the central portion, in the thickness direction, of the electrode roller 1 along the one plate member so that the two plate members to be butt-welded can be butt-welded by using the same electrode rollers 1, 2, even in the case of the thick plate member 31 and the thin plate member 32, which is shown in FIG. 2, even in the case of the thick plate member 31 and the thinner plate member 33, which is shown in FIG. 5, or in the case of the plate members 34, 35 having the same thickness size, which is shown in FIG. 6. Therefore, the electrode rollers 1, 2 can be used commonly so that it is made unnecessary to prepare various electrode rollers corresponding to two plate members of various plate members having various thickness sizes.

According to this embodiment, since electrode rollers not having projecting stepped portions corresponding to a difference in thickness between plate members are used, it is unnecessary to conduct maintenance work on the projecting amounts of the projecting stepped portions on the electrode members, so that workability on the electrode members is made excellent.

Figure 7:
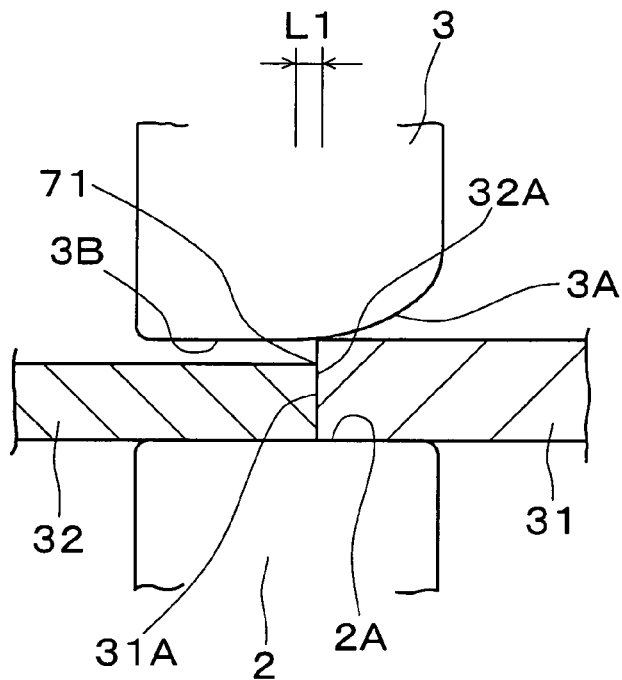
FIG. 7 is a view showing a state in which butt welding starts when a thick plate member and a first thin plate member are butt-welded with a second combination of a pair of two electrode rollers.
Figure 8:
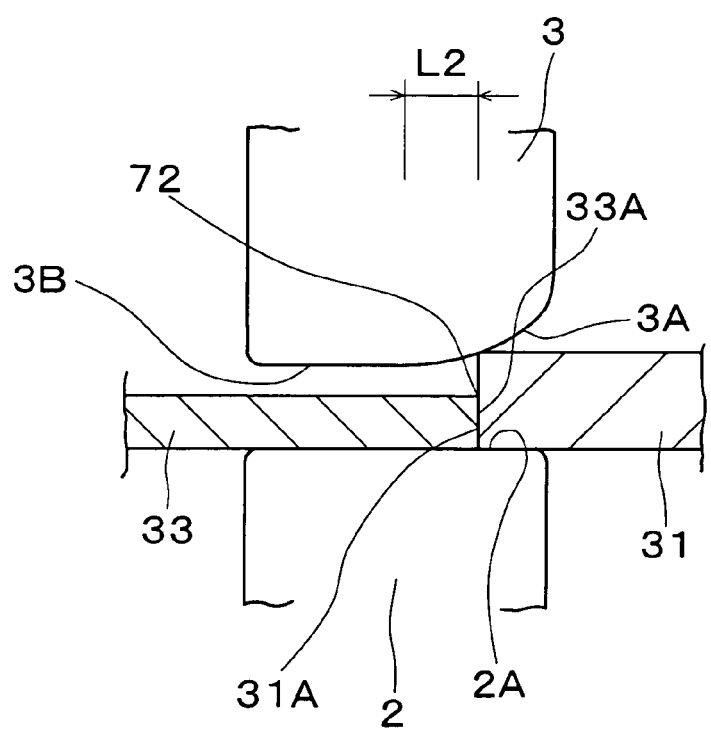
FIG. 8 is a view showing a state in which butt welding starts when a thick plate member and a second thin plate member are butt-welded by the combination of electrode rollers shown in FIG. 7.
Figure 9:
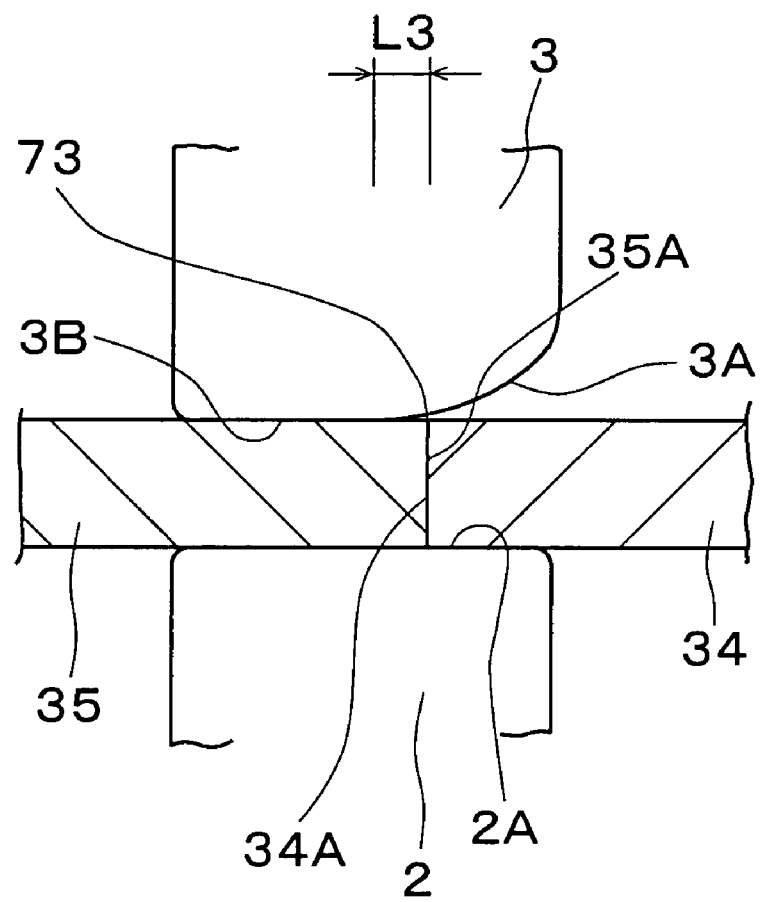
FIG. 9 is a view showing a state in which butt welding starts when two plate members having the same thickness size are butt-welded by the combination of the electrode rollers shown in FIG. 7.

FIG. 7 to FIG. 9 show a case where the same lower side electrode roller 2 as shown in FIG. 2 is used as a lower side roller and an electrode roller 3 different from the upper side electrode roller 1 shown in FIG. 2 is used as an upper side electrode roller.

FIG. 7 shows a case where the same plate members 31, 32 as shown in FIG. 2 are used as two plate members and a butting state of these plate members 31, 32 is set to the same state as shown in FIG. 2. Further, FIG. 8 shows a case where the same plate members 31, 33 as shown in FIG. 5 are used as two plate members and a butting state of these plate members 31, 33 is set to the same state shown in FIG. 5. Furthermore, FIG. 9 shows a case where the same plate members 34, 35 as shown in FIG. 6 are used as two plate members and a butting state of these plate members 34, 35 is set to the same state as shown in FIG. 6.

An upper side roller 3 shown in FIG. 7 to FIG. 9 is provided on its outer face with a convex portion 3A formed so as to gradually retreat from the plate member 31, 31 or 34 as it extends from a central portion, in a thickness direction, of the electrode roller 3 along the right side plate member 31, 31 or 34 of the two plate members. Further, the electrode roller 3 is provided on the outer face with a projecting continuous portion 3B having a projecting amount equal to the maximum projecting amount of the convex portion 3A which projects toward the two plate members 31 and 32, 31 and 33, or 34 and 35, that is, having a projecting amount equal to the projecting amount of the central portion, in the thickness direction, of the electrode roller 3. The projecting continuous portion 3B connected with the convex portion 3A constitutes a portion where the projecting amount equal to the maximum projecting amount of the convex portion 3A is continuous so as to extend from the central portion, in the thickness direction, of the electrode roller 3 along the plate member 32, 33 or 35.

In FIG. 7 and FIG. 8, an offset of the butt portion 71 or 72 of the two plate members 31 and 32, or 31 and 33 relative to the electrode rollers 2, 3 is set in a manner similar to the cases shown in FIG. 2 and FIG. 5. On the other hand, in FIG. 9, an offset of the butt portion 73 of the two plate members 34, 35 relative to the electrode rollers 2, 3 is set in a direction opposite to the direction shown in FIG. 6.

In these FIG. 7 to FIG. 9, a portion of the convex portion 3A including the central portion of the upper side electrode roller 3 in the thickness direction thereof first presses one plate member 31, 31 or 35 of the two plate members 31 and 32, 31 and 33 or 34 and 35. In FIG. 9, the projecting continuous portion 3B of the electrode roller 3 first presses the one plate member 35, too. Thereby, the end face 31A, 31A or 35A of the plate member 31, 31 or 35 swells and deforms to come in contact with the end face 32A, 33A or 34A of the plate member 32, 33 or 34. Next, in FIG. 7 and FIG. 8, the central portion, in the thickness direction, of the electrode roller 3 and the projecting continuous portion 3B press the plate member 32 or 33, and in FIG. 9, the convex portion 3A of the electrode roller 3 presses the plate member 34. Thereby, a nugget which bridges across the end faces 31A and 32A, 31A and 33A, or 34A and 35A is formed in a manner similar to the cases shown in FIG. 2, FIG. 5 and FIG. 6.

Two plate members comprising one of the various combinations shown in FIG. 7 to FIG. 9 can be butt-welded by the combination of the same electrode rollers 2 and 3.

Figure 10:
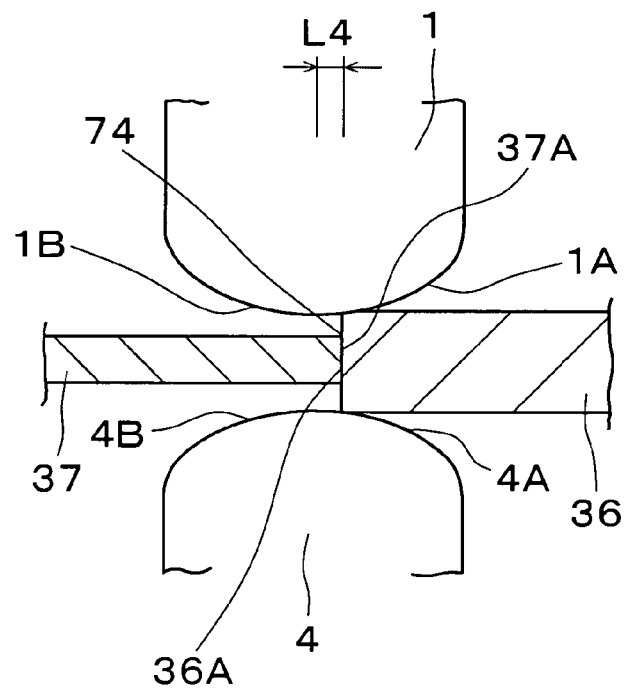
FIG. 10 is a view showing a state in which butt welding starts when a thick plate member and a third thin plate member are butt-welded with a third combination of a pair of two electrode rollers.
Figure 11:
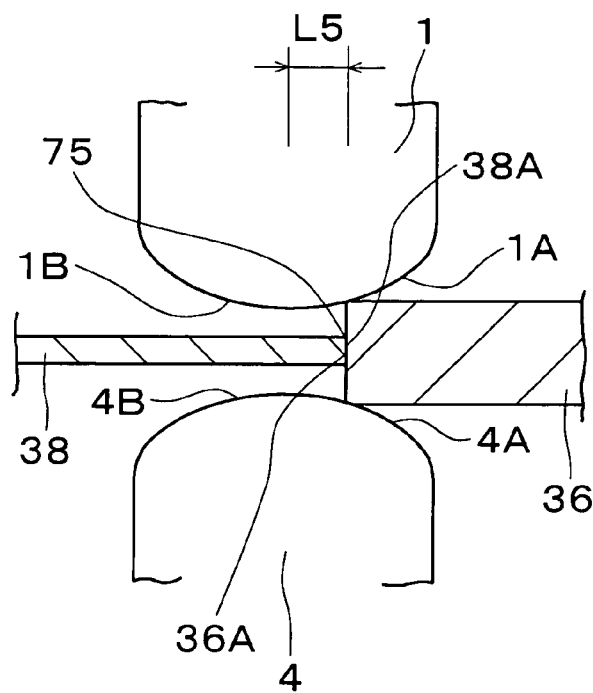
FIG. 11 is a view showing a state in which butt welding starts when a thick plate member and a fourth thin plate member are butt-welded by the combination of electrode rollers shown in FIG. 10.
Figure 12:
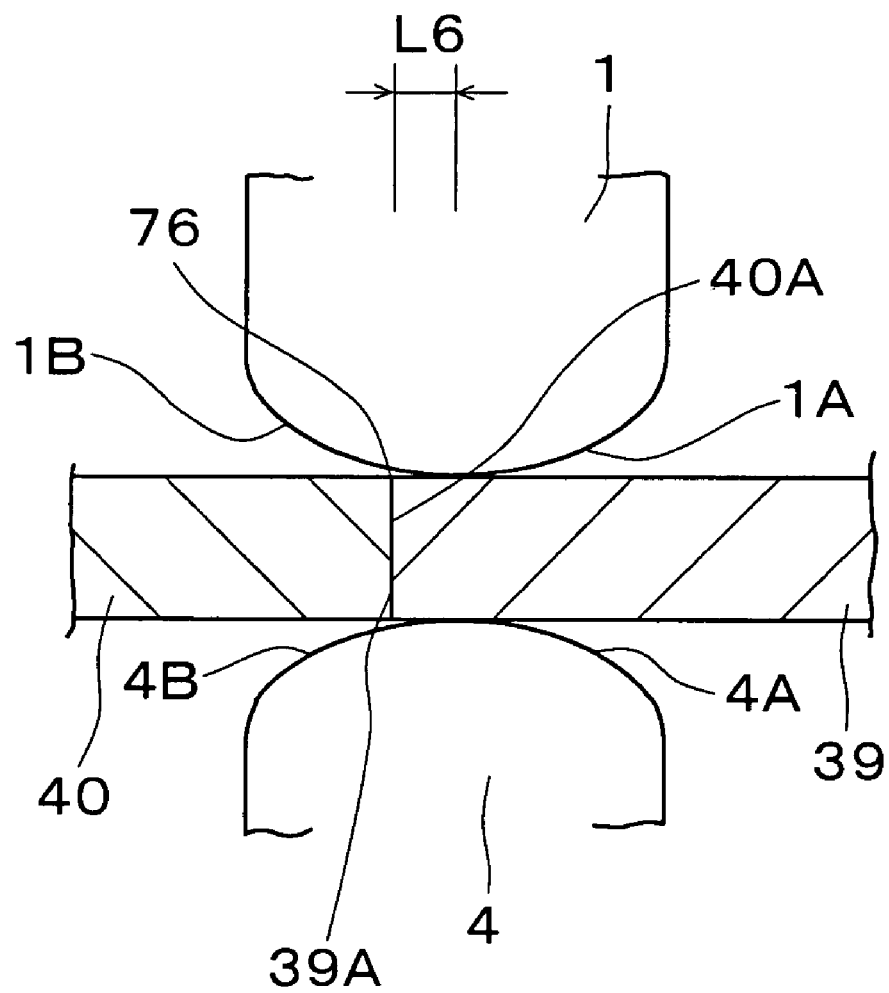
FIG. 12 is a view showing a state in which butt welding starts when two plate members having the same thickness size are butt-welded by the combination of electrode rollers shown in FIG. 10.

In FIG. 10 to FIG. 12, an upper side electrode roller of a pair of electrode rollers is the same upper side electrode roller 1 as shown in FIG. 2, and a lower side electrode roller is an electrode roller 4 formed so as to have the same outer face as that of the upper side electrode roller 1. Accordingly, the outer face of the lower side electrode roller 4 has an oval shape projecting toward two plate members to be butt-welded in a curved manner, and the outer face comprises a first convex portion 4A and a second convex portion 4B which are smoothly connected to each other at a central portion, in a thickness direction, of the electrode roller 4.

Two plate members shown in FIG. 10 are a thick plate member 36 having a large thickness size and a thin plate member 37 having a small thickness size. These plate members 36, 37 are fixedly set to the work table 61 in a state that a top surface and a back surface of the thick plate member 36 are shifted from a top surface and a back surface of the thin plate member 37 and the thin plate member 37 is positioned within the thickness of the thick plate member 36. The fixedly setting is performed such that a butt portion 74 of the two plate members 36, 37 is offset from the central portion in a thickness direction of the electrode rollers 1, 4 toward the first convex portions 1A, 4A of these electrode rollers 1, 4 by an amount L4.

Two plate members shown in FIG. 11 are the thick plate member 36 and a thin plate member 38 thinner than the thin plate member 37. These plate members 36, 38 are also fixedly set on the work table 61 in such a state that a top surface and a back surface of the thick plate member 36 are shifted from a top surface and a back surface of the thin plate member 38 and the thin plate member 38 is positioned within the thickness of the thick plate member 36. The fixedly setting is performed such that a butt portion 75 of the two plate members 36, 38 is offset from the central portion in a thickness direction of the electrode rollers 1, 4 toward the first convex portions 1A, 4A of these electrode rollers 1, 4 by an amount L5. The offset amount L5 is larger than the offset amount L4 shown in FIG. 10.

Two plate members shown in FIG. 12 are plate members 39, 40 having the same thickness size. Butting between end faces 39A, 40A of the plate members 39, 40 is performed in a state that a surface and a back surface of the plate member 39 are coincident with those of the plate member 40 without any step difference. Further, a butt portion 76 of the plate members 39, 40 is offset from the central portions, in the thickness directions, of the electrode rollers 1, 4 toward the second convex portions 1B, 4B of the electrode rollers 1, 4 by an amount L6.

In FIG. 10 to FIG. 12, one portion of the first convex portions 1A, 4A is formed so as to include central portions, in the thickness directions, of the upper and lower electrode rollers 1, 4 first press one plate member 36, 36 or 39 of two plate members 36 and 37, 36 and 38, or 39 and 40. Thereby, an end face 36A, 36A or 39A of the plate member 36, 36 or 39 swells and deforms to come in contact with an end face 37A, 38A or 40A of the plate member 37, 38 or 40. Next, in FIG. 10 and FIG. 11, the central portions, in thickness directions, of both the electrode rollers 1, 4 and the second convex portions 1B, 4B press the plate member 37 or 38, and in FIG. 12, the second convex portions 1B, 4B of both the electrode rollers 1, 4 press the plate member 40. Thereby, a nugget which bridges across the end faces 36A and 37A, 36A and 38A, or 39A and 40A is formed.

Then, two plate members constituted with one of various combinations shown in FIG. 10 to FIG. 12 can be butt-welded by the combination of the same electrode rollers 1 and 4.

Figure 13:
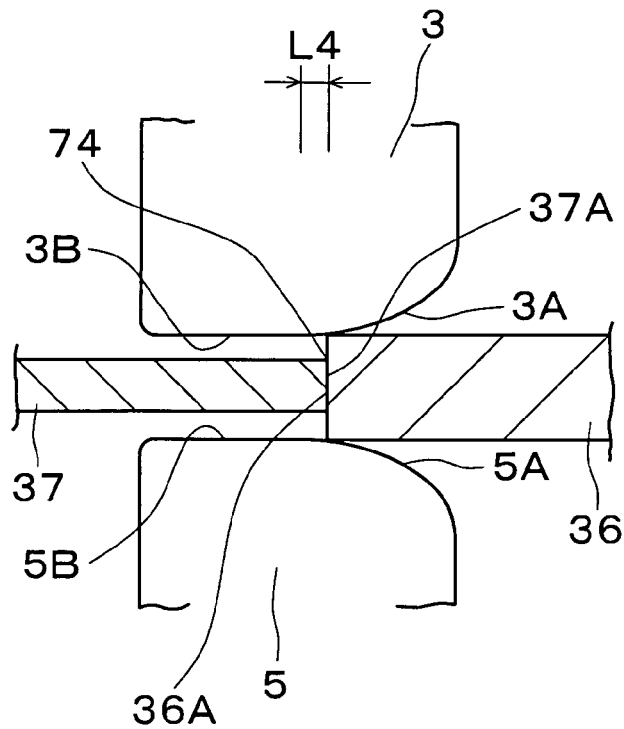
FIG. 13 is a view showing a state in which butt welding starts when the thick plate member and the third thin plate member are butt-welded with a fourth combination of a pair of two electrode rollers.
Figure 14:
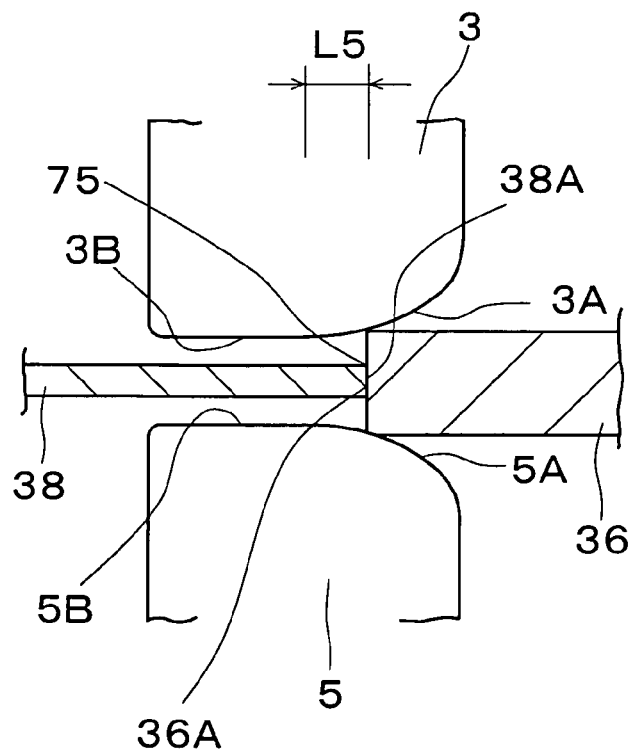
FIG. 14 is a view showing a state in which butt welding starts when the thick plate member and the fourth thin plate member are butt-welded by the combination of electrode rollers shown in FIG. 13.
Figure 15:
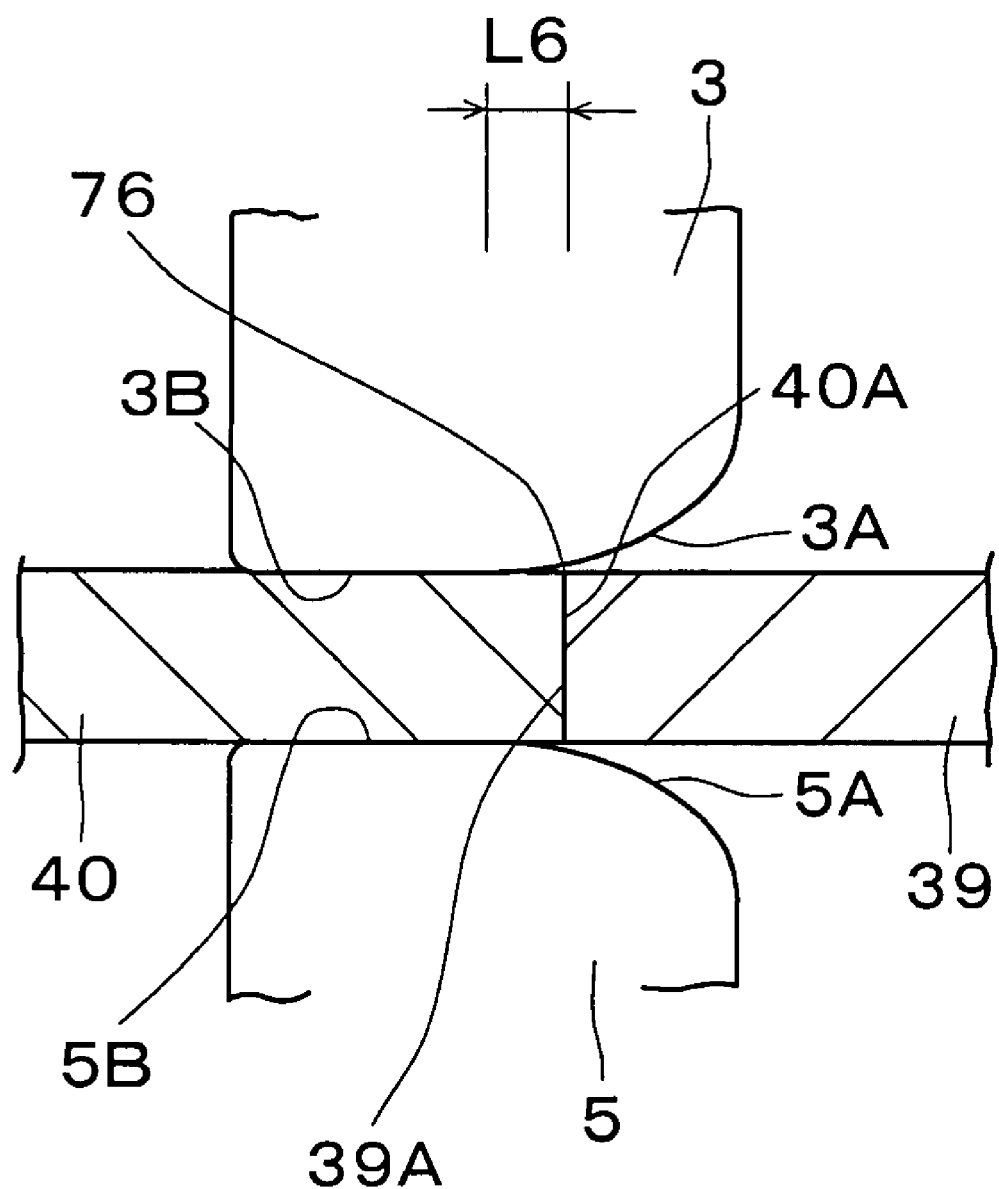
FIG. 15 is a view showing a state in which butt welding starts when two plate members having the same thickness size are butt-welded by the combination of electrode rollers shown in FIG. 13.

FIG. 13 to FIG. 15 show cases that two plate members 36 and 37, 36 and 38, and 39 and 40 which are respectively the same plate members as shown in FIG. 10 to FIG. 12 are butt-welded by a pair of electrode rollers different from the pair of electrode rollers shown in FIG. 10 to FIG. 12. An upper side electrode roller of these electrode rollers is the same upper side electrode roller 3 as shown in FIG. 7, and a lower side electrode roller is an electrode roller 5 formed so as to have the same outer face as that of the upper side electrode roller 3. Accordingly, the outer face of the lower side electrode roller 5 comprises a convex portion 5A and a projecting continuous portion 5B, and the convex portion 5A and the projecting continuous portion 5B are smoothly connected to each other at a central portion, in a thickness direction, of the electrode roller 5.

Further, in FIG. 13 and FIG. 14, the orientation of the offset and an amount thereof of butt portions 74, 75 of two plate members 36 and 37, or 36 and 38 to central portions, in the thickness directions, of a pair of electrode rollers 3, 5 are the same as those in FIG. 10 and FIG. 11. In FIG. 15, however, an orientation of offset of a butt portion 76 of two plate members 39 and 40 to central portions, in the thickness directions, of the pair of electrode members 3, 5 is opposite to the case shown in FIG. 12, and the butt portion 76 is offset from the central portions, in the thickness directions, of the electrode rollers 3, 5 toward the convex portions 3A, 5A of the electrode rollers 3, 5 by an amount L6.

In these FIG. 13 to FIG. 15, one portion of convex portions 3A, 5A, formed so as to include central portions, in the thickness directions, of upper and lower electrode rollers 3, 5, first press one plate member 36, 36, or 40 of two plate members 36 and 37, 36 and 38, or 39 and 40, while continuous portions 3B, 5B of the electrode rollers 3, 5 also press the one plate member 40 in FIG. 15. Thereby, an end face 36A, 36A, or 40A of the plate member 36, 36, or 39 swells and deforms to come in contact with an end face 37A, 38A or 39A of the plate member 37, 38, or 39. Next, in FIG. 13 and FIG. 14, central portions, in the thickness directions, of the electrode rollers 3 and 5 and projecting continuous portions 3B and 5B thereof press the plate member 37 or 38, while the convex portions 3A and 5A press the plate member 39 in FIG. 15. Thereby, a nugget which bridges across the end faces 36A and 37A, 36A and 38A, or 39A and 40A is formed.

Then, two plate members 36 and 37, 36 and 38, or 39 and 40 constituted with one of various combinations shown in FIG. 13 to FIG. 15 can be butt-welded by the combination of the electrode rollers 3 and 5 having the same outer shape.

Further, butt welding of two plate members 36 and 37, 36 and 38, or 39 and 40 comprising one of various combinations shown in FIG. 13 to FIG. 15 can also be performed by utilizing the electrode roller 1 shown in FIG. 1 or the electrode roller 4 shown in FIG. 10 as one of the pair of electrode rollers and utilizing the electrode roller 3 or 5 shown in FIG. 13 as the other electrode roller.

In the embodiments described above, the pair of electrode members are the electrode rollers, but these electrode members may be replaced with block electrodes installed in a press apparatus.

Figure 16:
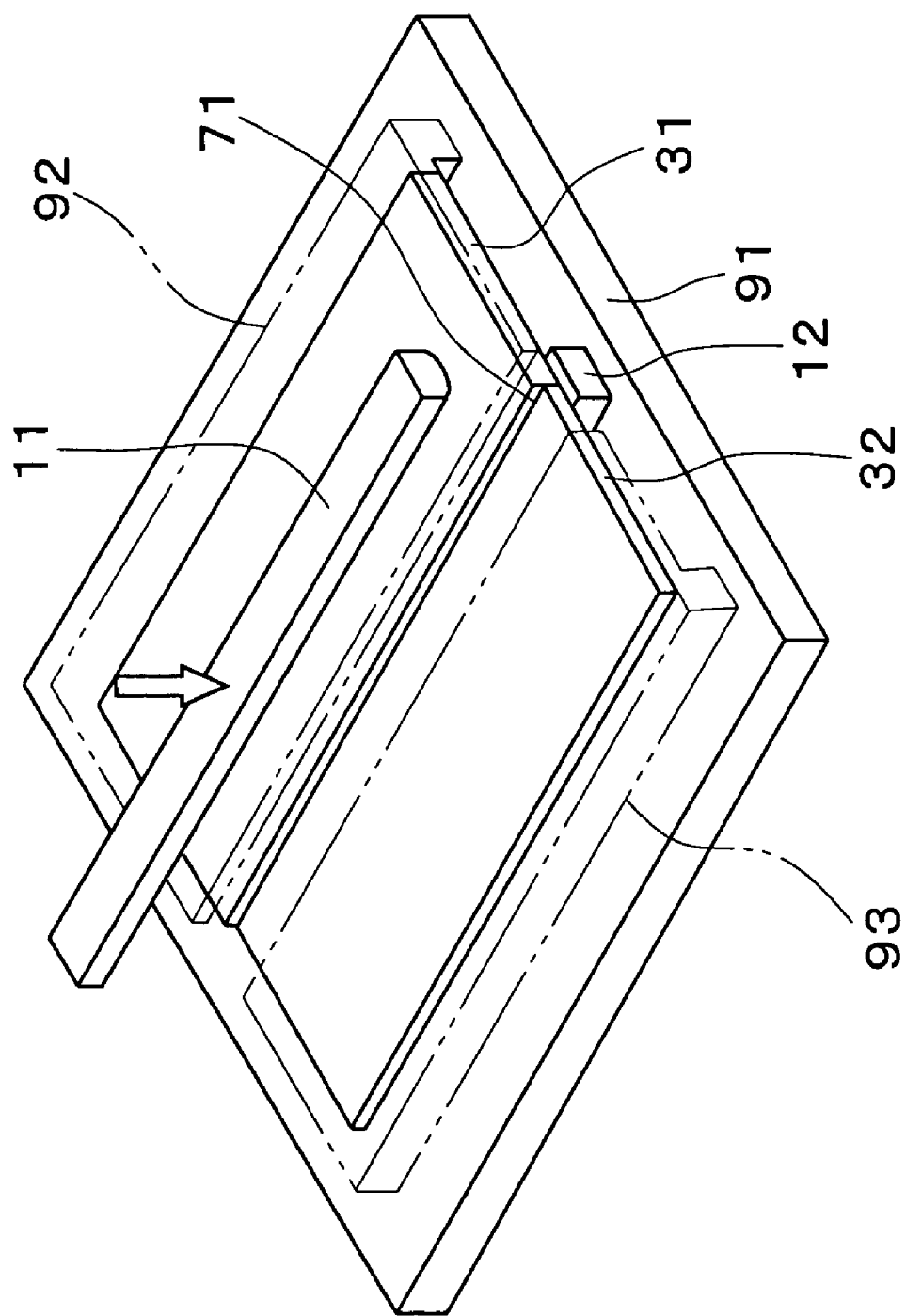
FIG. 16 is a perspective view schematically showing a butt welding apparatus of an embodiment where electrode members are block electrodes.
Figure 17:
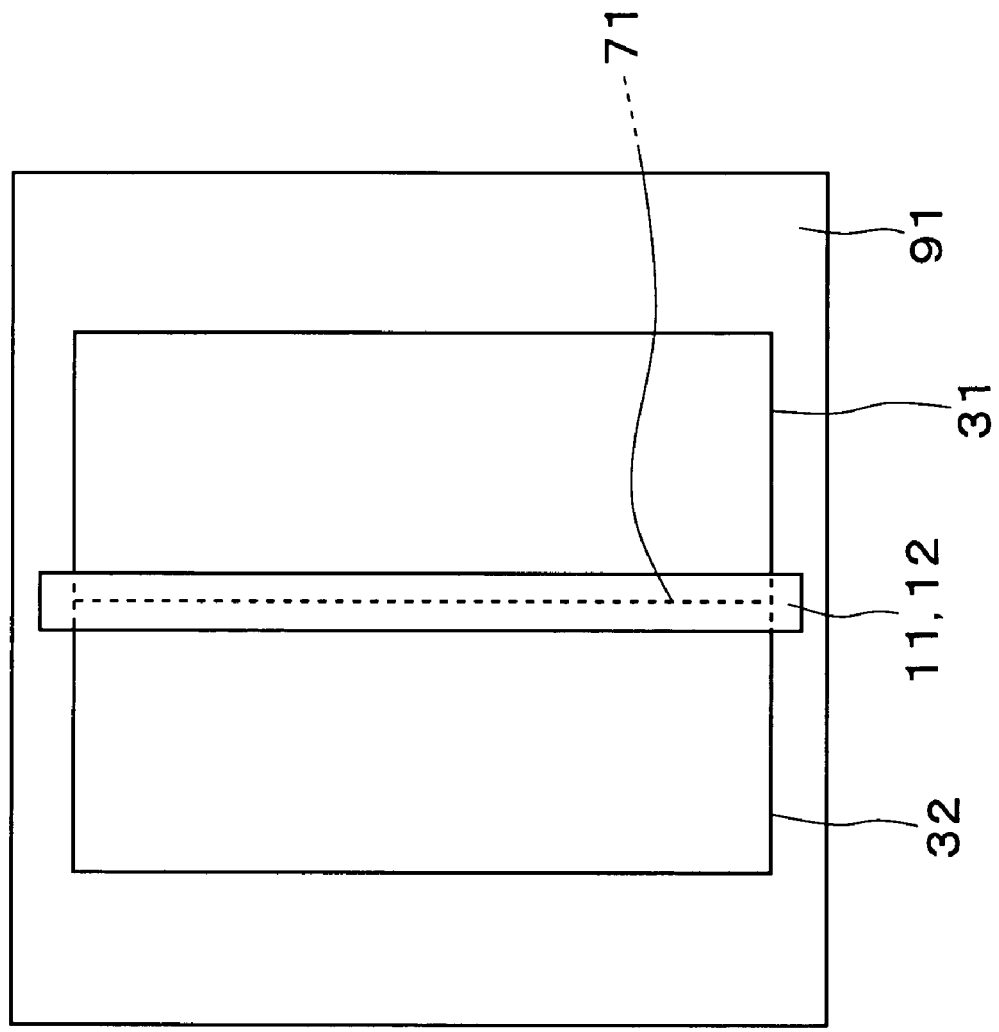
FIG. 17 is a plan view of the butt welding apparatus shown in FIG. 16.

That is, in an embodiment shown in FIG. 16, a block electrode 11 disposed on an upper side corresponding to surface sides of a thick plate member 31 and a thin plate member 32 which are plate members to be welded, and a block electrode 12 disposed on a lower side corresponding to back surfaces of the thick plate member 31 and the thin plate member 32 have thickness sizes bridging across the thick plate member 31 and the thin plate member 32. As shown in FIG. 17, which is a plan view of the apparatus shown in FIG. 16, the block electrodes 11 and 12 have length sizes extending linearly along a butt portion 71 of the plate members 31 and 32.

In other words, since the butt portion 71 of the thick plate member 31 and the thin plate member 32 extends linearly, the block electrodes 11 and 12 have such shapes as to extend linearly to correspond to the butt portion 71.

The block electrode 11 is mounted on an ascending/descending member such as a slide which ascends/descents in the press apparatus, and a block electrode 12 is mounted on an upper face of a board member 91 connected to a stationary member such as bolsters in the press apparatus. The board member 91 is provided with the fixing tools 92, 93 for butting the plate members 31 and 32 in a predetermined positional relationship to fixedly set them on the board member 91.

The upper side block electrode 11 descends toward the board member 91 so that the block electrodes 11 and 12 press the butt portion 71. At this time, power is supplied between the block electrodes 11 and 12.

Since the plate members 31, 32 shown in FIG. 16 are the same plate members as shown in FIG. 2 to FIG. 4, the block electrodes 11 and 12 have the same sectional shapes as the outer peripheral faces of the electrode rollers 1 and 2 shown in FIG. 2 to FIG. 4. For this reason, butt welding of the thick plate member 31 and the thin plate member 32 performed by the descending of the block electrode 11 progresses in the same order as shown in FIG. 2, FIG. 3 and FIG. 4.

Further, since the block electrodes 11, 12 have the same sectional shapes as the outer peripheral shapes of the electrode rollers 1 and 2 shown in FIG. 2 to FIG. 4, butt-welding can be performed using these block electrodes 11 and 12, even when the two plate members to be butt-welded are the plate members 31 and 33 shown in FIG. 5 and even when they are the plate members 34 and 35 shown in FIG. 6. Of course, the sectional shapes of the pair of block electrodes may be the same outer peripheral face shapes as the electrode rollers 2, 3 shown in FIG. 7, the electrode rollers 1, 4 shown in FIG. 10, or the electrode rollers 3, 5 shown in FIG. 13.

Figure 18:
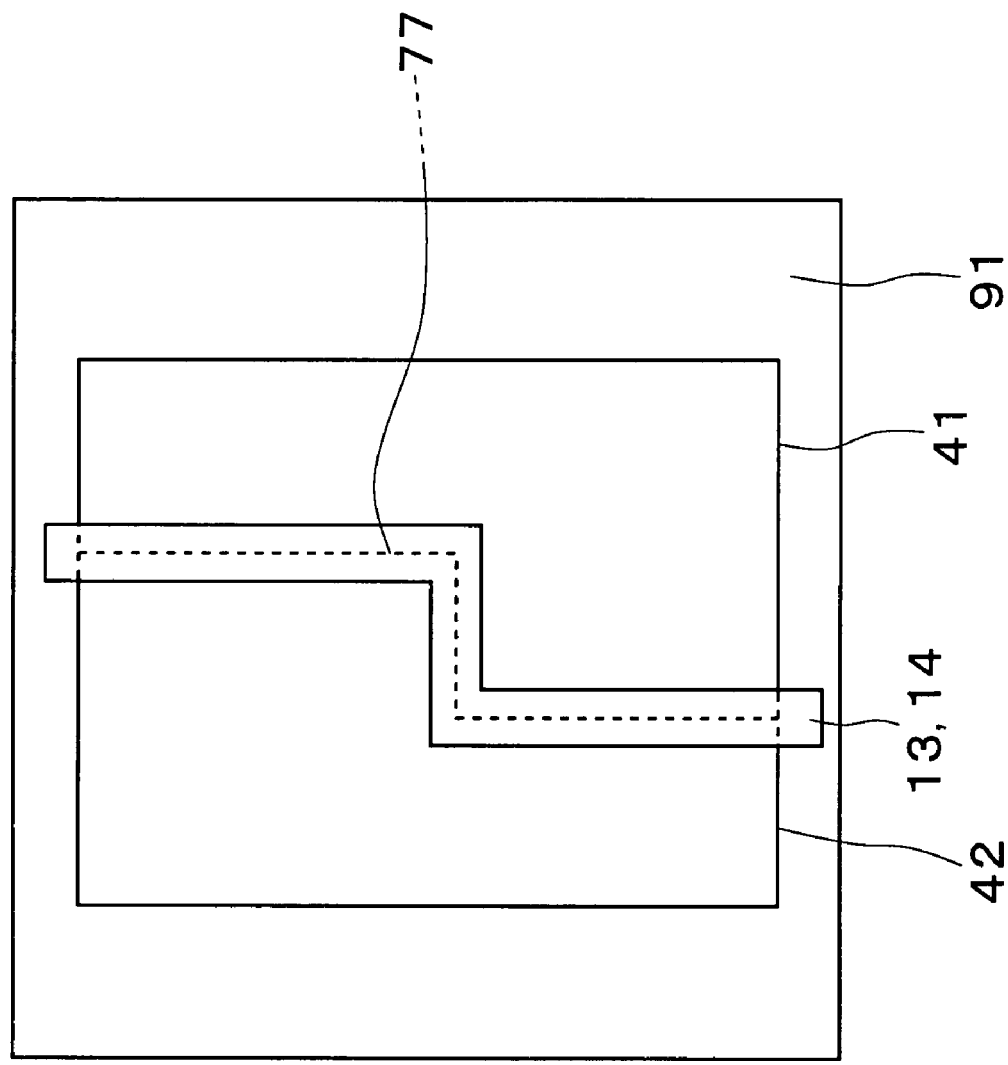
FIG. 18 is a view similar to that in FIG. 17, showing an embodiment where block electrodes are formed to extend non-linearly so as to correspond to a butt portion of two plate members.

FIG. 18 shows another embodiment where block electrodes are used as a pair of electrode members. Since end faces of two plate members 41, 42 in this embodiment are each formed in a shape of straight lines connected at a right angle, a butt portion 77 obtained by butting these end faces to each other extend in a non-linear manner. Accordingly, block electrodes 13, 14, which are the electrode members for pressing the butt portion 77, also extend non-linearly to correspond to the shape of the butt portion 77.

In other words, since the butt portion 77 of the plate member 41 and the plate member 42 extends non-linearly, the block electrodes 13 and 14 each have a non-linearly extending shape corresponding to the butt portion 77.

Figure 19:
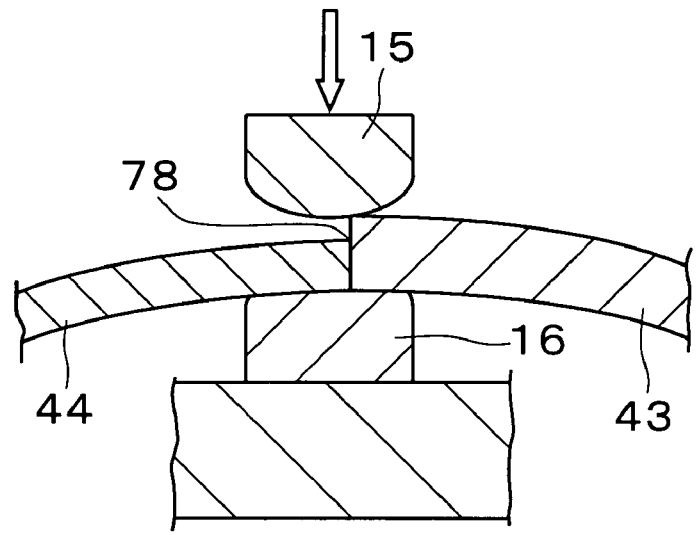
FIG. 19 is a vertical sectional view showing an embodiment where press-formed two plate members are butt-welded by block electrodes.

Two plate members 43, 44 according to an embodiment shown in FIG. 19 are preliminarily press-formed in a predetermined shape, such as a curved shape, before they are butt-welded by block electrodes 15, 16. For this reason, the shapes of the block electrodes 15, 16 correspond to the shapes of the press-formed plate members 43, 44. That is, in this embodiment, when the two plate members 43, 44 are curved in the lengthwise directions of the block electrodes 15, 16, the block electrodes 15, 16 are also curved in the lengthwise directions of the block electrodes 15, 16.

According to this embodiment, a butt portion 78 of the preliminarily press-formed plate members 43, 44 can be butt-welded by the block electrodes 15, 16.

Figure 20:
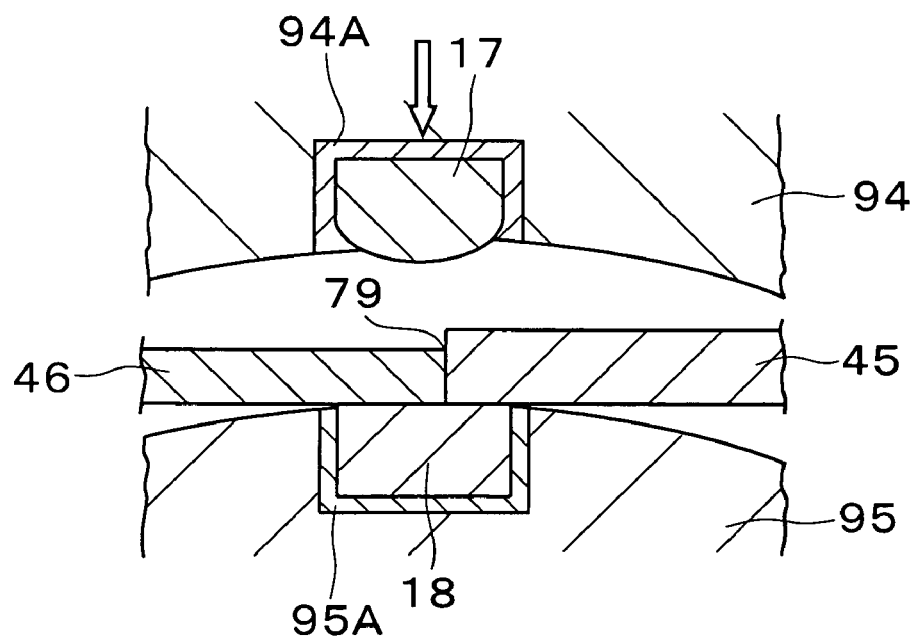
FIG. 20 is a vertical sectional view showing an embodiment where block electrodes have been disposed in dies for press-forming two plate members.

In an embodiment shown in FIG. 20, a pair of block electrodes 17, 18 are disposed in upper and lower press dies 94, 95 for press-forming two plate members 45, 46. For this reason, when the plate members 45, 46 are press-formed in predetermined shapes by the press dies 94, 95, a butt portion 79 of the plate members 45 and 46 is butt-welded by the block electrodes 17, 18. The block electrodes 17, 18 are assembled in the press dies 94, 95 via electrically insulating members 94A, 95A. For this reason, current conduction to the block electrodes 17, 18 for butt-welding the plate members 45, 46 with electric resistance heat is performed in a state where the press-forming dies 94, 95 and the block electrodes 17, 18 have been electrically insulated from each other.

According to this embodiment, press forming and butt welding can be simultaneously conducted on the two plate members 45, 46. For this reason, for example, when a constituent member for a vehicle body of a vehicle comprising a tailored blank obtained by joining a plurality of plate members is manufactured, its production efficiency can be improved remarkably.

FIG. 21 shows an embodiment where spot electrodes 21, 22 are used as a pair of electrode members. These spot electrodes 21, 22 are disposed at positions corresponding to a butt portion 71 of a thick plate member 31 and a thin plate member 32 which are plate members to be welded, where a pressing force is applied from one spot electrode of these spot electrodes toward the other spot electrode thereof, so that the butt portion 71 is butt-welded. Shapes of portions of the pair of spot electrodes which face two plate members are formed so as to correspond to the outer shapes of two of the various electrode rollers shown in FIG. 1 to FIG. 15, so that two plate members to be butt-welded can be set to any one of the combinations shown in FIG. 1 to FIG. 15.

Further, even when the pair of spot electrodes are used as the pair of electrode members in this manner, two press-formed plate members can be butt-welded by these spot electrodes in the same manner as with the block electrodes.

Furthermore, the respective spot electrodes are disposed in press dies for press-forming two plate members so that, when the two plate members are press-formed in these press dies, butt welding of these plate members can be performed by one pair of spot electrodes.

In a case where the respective spot electrodes are disposed in press dies for press-forming two plate members, the respective spot electrodes are assembled in the respective press dies via electrically insulating members, so that an electrically insulating state between the spot electrodes and the press dies can be ensured.

Figure 22:
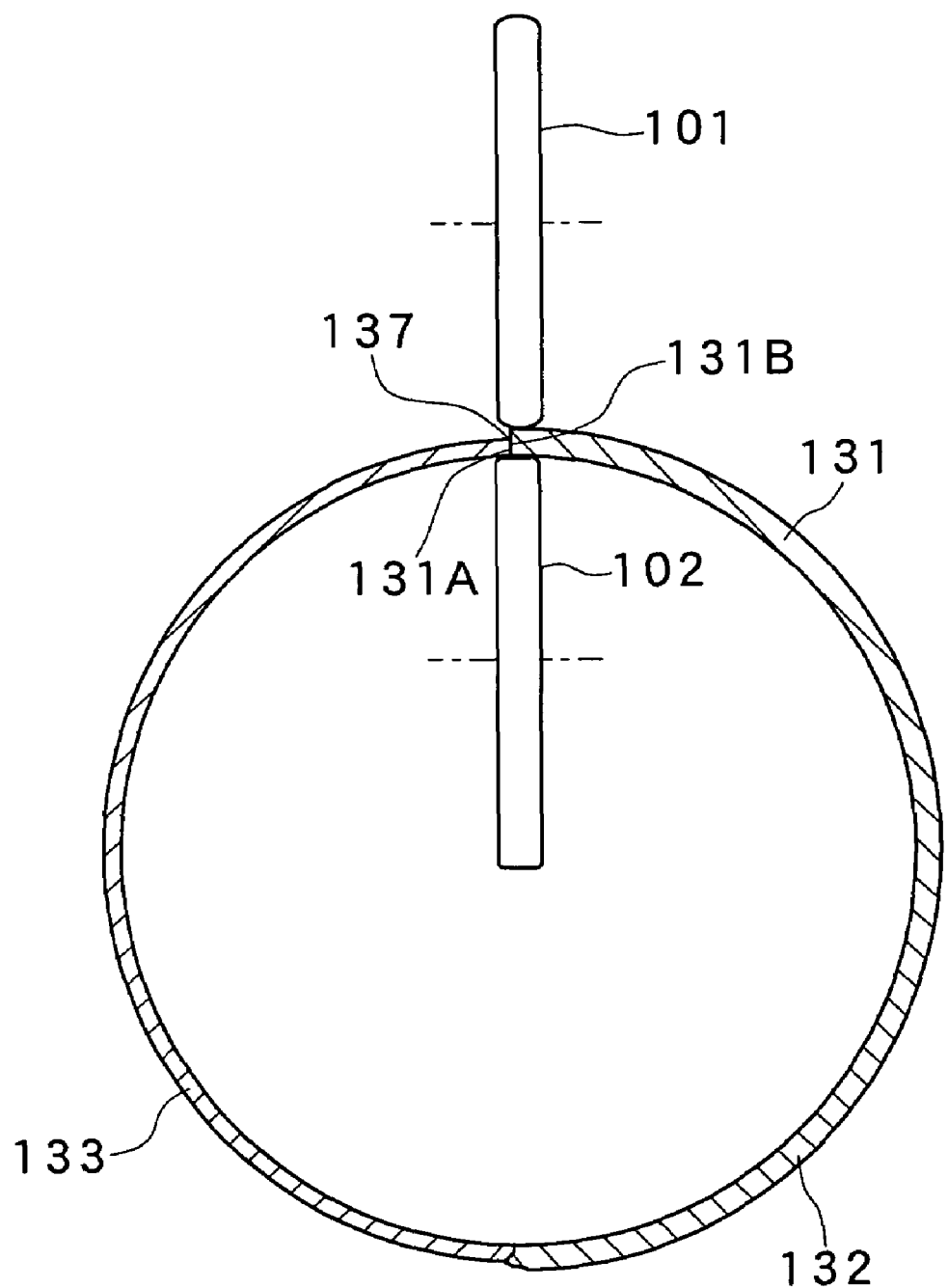
FIG. 22 is a vertical sectional view of a plate member showing an embodiment where the plate member is formed by joining two plate members having different thicknesses when one plate member is bent in a pipe shape and a butt portion formed by butting both end faces of the plate member is welded.

In an embodiment shown in FIG. 22, one plate member 131 is to be butt-welded and the one plate member 131 is bent in a circular pipe shape. Then, the plate member 131 is a tailored blank manufactured by joining two plate members 132, 133 having different thickness sizes by a joining means such as welding. Two end faces 131A, 131B positioned on both side portions of the plate member 131 are butted to form a butt portion 137, and two electrode rollers 101, 102 having thickness sizes bridging across the butt portion 137 are arranged on both sides, in a thickness direction, of the plate member 131, namely, outside and inside of the pipe formed of the plate member 131.

In the same manner as the embodiments explained above, power is supplied between the electrode rollers 101 and 102 while the butt portion 137 is being pressed by the electrode rollers 101 and 102, the electrode rollers 101 and 102 are rotated while the plate member 131 is being moved in a direction of extension of the butt portion 137, or the electrode rollers 101 and 102 are moved in a direction of extension of the butt portion 137 to the plate member 131 while the electrode rollers 101 and 102 are being rotated, so that the butt portion 137 can be butt-welded continuously with electric resistance heat.

Figure 23:
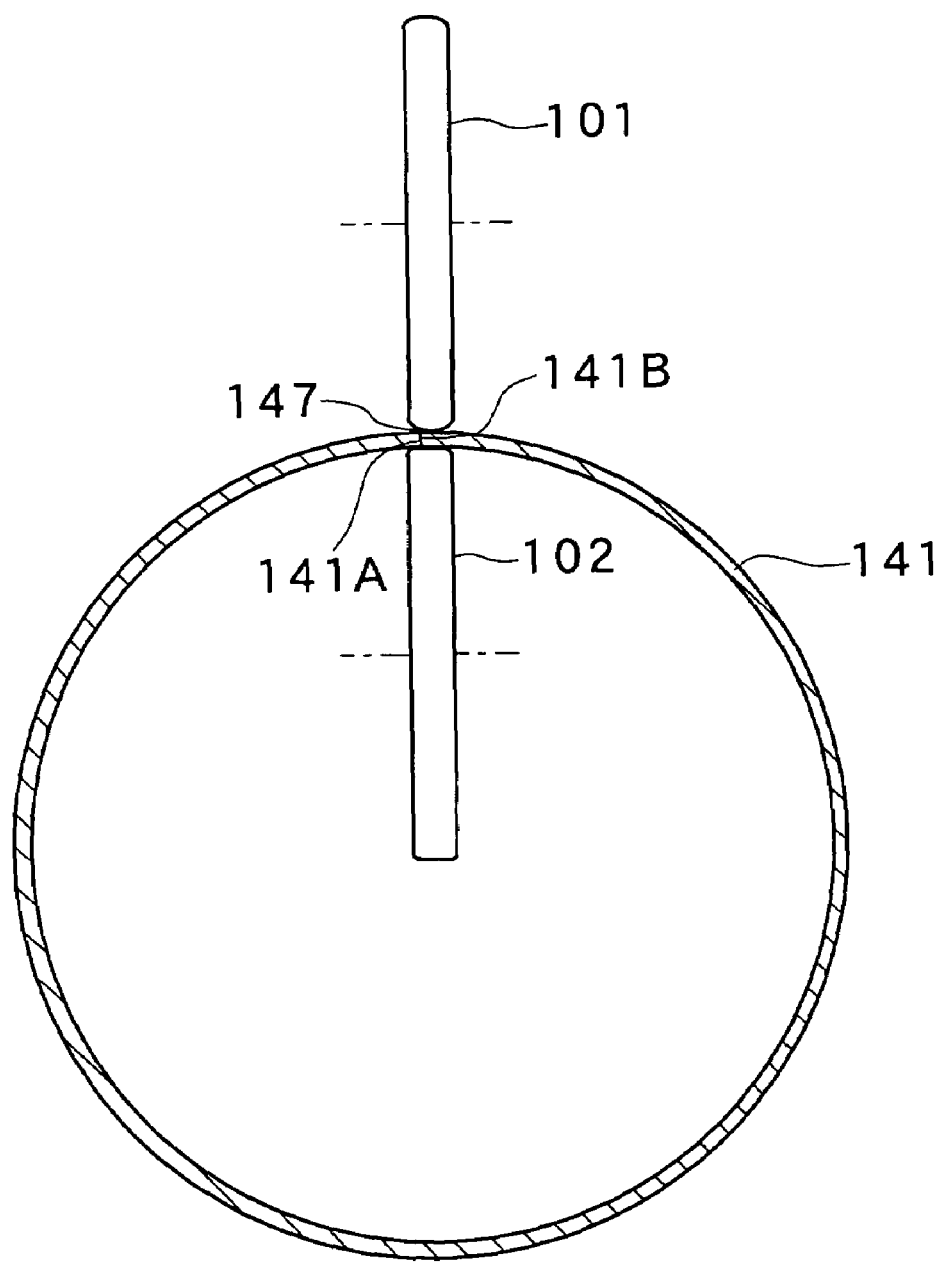
FIG. 23 is a front sectional view of a plate member showing an embodiment where one plate member having an equally continuous thickness is bent in a pipe shape and a butt portion formed by butting both end faces of the plate member is welded.

In an embodiment shown in FIG. 23, one plate member 141 is to be butt-welded, and the plate member 141 bent in a circular pipe shape has a continuous equal thickness size. A butt portion 147 formed by butting end faces 141A, 141B of the plate member 141 to each other is butt-welded by electrode rollers 101 and 102 like the embodiment shown in FIG. 22.

As understood from these embodiments shown in FIGS. 22 and 23, the number of plate members whose end faces are butted to each other and welded may be one plate formed in a pipe shape. Then, a pair of two electrode members for welding a butt portion of one plate member formed in a pipe shape may be the electrode rollers, the block electrodes or the spot electrodes like the embodiments shown in FIG. 1 to FIG. 21. These electrode members may have the same outer face shapes as the various electrode rollers shown in FIG. 1 to FIG. 15. Further, when a pair of electrode members are constituted of the block electrodes or the spot electrodes, these block electrodes or spot electrodes may be arranged in a press dies for press-forming one plate member formed in a pipe shape.

INDUSTRIAL APPLICABILITY

As described above, the present invention is suitable to butt-weld end faces of at least one plate member by a pair of electrode members to manufacture a product such as, for example, a vehicle body of a vehicle or various members to be mounted to the vehicle body by the butt welding.

The invention claimed is:

1. A butt welding apparatus for butt welding end faces of at least one plate member by electric resistance heating, comprising:

means for supporting the at least one plate member such that the end faces abut each other and form a butt portion;
a pair of electrode members disposed opposite to one another for performing electric resistance heat welding of the butt portion, said pair of electrode members comprising a first electrode member provided at a first side of the butt portion and a second electrode member provided at a second side of the butt portion opposite to the first side, said first electrode member being positioned so that it extends across the butt portion and having an outer surface with a first convex portion which faces the at least one plate member and gradually retreats therefrom as it extends from an intermediate portion of the first electrode member outer surface and the second electrode member being positioned such that it extends across the butt portion; and
means for causing relative movement of the first and second electrode members toward each other and contacting of a surface of the at least one plate member with the first electrode member at the first side of the butt portion and surfaces of the at least one plate member on opposite sides of the butt portion, at the second side thereof, with the second electrode member and cause an end face thereof to deform toward the other end face, melt and join with the other end face.

2. The butt welding apparatus of claim 1, wherein the first electrode member additionally comprises a second convex portion connected to the first convex portion at the intermediate portion of the first electrode, the second convex portion gradually retreating from the at least one plate member as it extends away from the intermediate portion.

3. The butt welding apparatus of claim 1, wherein the first electrode member additionally comprises a flat portion connected to the first convex portion at the intermediate portion of the first electrode member, the flat portion and the intermediate portion of the first electrode member being contained in a plane which is approximately parallel to the at least one plate member.

4. The butt welding apparatus of claim 1, wherein the second electrode member has an outer surface with a flat portion which faces and is approximately parallel to the at least one plate member.

5. The butt welding apparatus of claim 1, wherein the second electrode member has an outer surface with a first convex portion which faces the at least one plate member and gradually retreats therefrom as it extends from an intermediate portion of the second electrode member outer face and a second convex portion connected to the first convex portion at the intermediate portion of the second electrode member, the second convex portion gradually retreating from the at least one plate member as it extends away from the intermediate portion of the second electrode member.

6. The butt welding apparatus of claim 1, wherein the second electrode member has an outer surface with a first convex portion which faces the at least one plate member and gradually retreats therefrom as it extends from an intermediate portion of the second electrode member outer face and a flat portion connected to the first convex portion at the intermediate portion of the second electrode member, the flat portion and the intermediate portion of the second electrode member being contained in a plane which is approximately parallel to the at least one plate member.

7. The butt welding apparatus of claim 1, wherein the pair of electrode members are electrode rollers which roll relative to the at least one plate member.

8. The butt welding apparatus of claim 1, wherein the pair of electrode members are block electrodes which extend along the length of the butt portion and are means for applying a press load on the at least one plate member.

9. The butt welding apparatus of claim 8, wherein the butt portion extends linearly and the block electrodes have linearly extending shapes corresponding to the butt portion.

10. The butt welding apparatus of claim 8, wherein the butt portion extends non-linearly and the block electrodes have non-linearly extending shapes corresponding to the butt portion.

11. The butt welding apparatus of claim 8, wherein the block electrodes have shapes corresponding to the shape of the at least one plate member.

12. The butt welding apparatus of claim 8, wherein the block electrodes are arranged in respective press dies for press-forming the at least one plate member.

13. The butt welding apparatus of claim 12, wherein the block electrodes are assembled in the respective press dies via electrically insulating members.

14. The butt welding apparatus of claim 1, wherein the electrode members are spot electrodes for spot-welding the at least one plate member.

15. The butt welding apparatus of claim 14, wherein the spot electrodes are for butt-welding a press-formed at least one plate member.

16. The butt welding apparatus of claim 14, wherein the spot electrodes are arranged in respective press dies for press-forming the at least one plate member.

17. The butt welding apparatus of claim 16, wherein the spot electrodes are assembled in the respective press dies via electrically insulating members.

18. The butt welding apparatus of claim 1, wherein the at least one plate member comprises two plate members and the butt portion is formed by butting respective end faces of the two plate members to each other.

19. The butt welding apparatus of claim 1, wherein the at least one plate member comprises one plate member and the butt portion is formed by butting two end faces of the one plate member.

20. The butt welding apparatus of claim 19, wherein the one plate member is formed by joining a plurality of plate members.

21. A butt welding method for butt welding end faces of at least one plate member by electric resistance heating, comprising the steps of:
supporting the at least one plate member such that the end faces abut each other and form a butt portion;
providing a butt welding apparatus comprising a pair of electrode members disposed opposite to one another for performing electric resistance heat welding of the butt portion, said pair of electrode members comprising a first electrode member provided at a first side of the butt portion and a second electrode member provided at a second side of the butt portion opposite to the first side, the first electrode member having an outer surface with a first convex portion which faces the at least one plate member and gradually retreats therefrom as it extends from an intermediate portion of the first electrode member;
positioning the electrode members such that they extend across the butt portion and the intermediate portion is offset from a joint portion by an amount based on the thicknesses of the end faces forming the joint portion in the direction of the first convex portion; and
pressing a surface of the at least one plate member with the first electrode member at the first side of the butt portion and surfaces of the at least one plate member on opposite sides of the butt portion, at the second side thereof, with the second electrode member while performing electric resistance heating of the at least one plate member to cause an end face thereof to deform towards the other end face, melt and join with the other end face.

22. The butt welding method of claim 21, wherein the pair of electrode members are arranged in respective press dies for press-forming the at least one plate member.

* * * * *